United States Patent
Daami et al.

(10) Patent No.: US 12,379,498 B2
(45) Date of Patent: Aug. 5, 2025

(54) LIDAR IMAGING SYSTEM WITH FMCW TYPE HETERODYNE DETECTION COMPRISING A DEVICE FOR CORRECTING THE PHASE OF THE REFERENCE SIGNAL

(71) Applicant: COMMISSARIAT A L'ENERGIE ATOMIQUE ET AUX ENERGIES ALTERNATIVES, Paris (FR)

(72) Inventors: Anis Daami, Grenoble (FR); Laurent Frey, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 917 days.

(21) Appl. No.: 17/457,109

(22) Filed: Dec. 1, 2021

(65) Prior Publication Data

US 2022/0187457 A1 Jun. 16, 2022

(30) Foreign Application Priority Data

Dec. 13, 2020 (FR) ..................... 20 13123

(51) Int. Cl.
*G01S 17/34* (2020.01)
*G01S 7/481* (2006.01)
(Continued)

(52) U.S. Cl.
CPC ............ *G01S 17/34* (2020.01); *G01S 7/4817* (2013.01); *G01S 7/4911* (2013.01); *G01S 7/4917* (2013.01)

(58) Field of Classification Search
CPC ...... G01S 17/34; G01S 7/4817; G01S 7/4911; G01S 7/4917; G01S 7/4811;
(Continued)

(56) References Cited

U.S. PATENT DOCUMENTS

| 2013/0044311 A1 | 2/2013 | Rakuljic |
| 2015/0177380 A1 | 6/2015 | Satyan et al. |
| 2020/0256995 A1 | 8/2020 | Inoue et al. |

FOREIGN PATENT DOCUMENTS

| FR | 2 677 456 A1 | 12/1992 |
| GB | 2 256 764 A | 12/1992 |

OTHER PUBLICATIONS

French Preliminary Search Report issued Aug. 27, 2021 in French Application 20 13123 filed on Dec. 13, 2020, 10 pages (with English Translation of Categories of Cited Documents & Written Opinion).

(Continued)

*Primary Examiner* — Daniel L Murphy
(74) *Attorney, Agent, or Firm* — Oblon, McClelland, Maier & Neustadt, L.L.P.

(57) ABSTRACT

The invention relates to a LIDAR imaging system of the FMCW type, comprising a light source (10), an optical projection device (20), an optical transmission device (30), an optical imaging device (40), and a matrix photodetector (50). It further comprises a phase correction device (60) comprising a spatial phase modulator (61) for applying a corrected spatial phase distribution to the reference signal, and a computation unit (62) for determining the corrected spatial phase distribution, by taking into account a spatial distribution representing a spatial intensity distribution of the backscattered object signal, so that the reference signal has a corrected spatial intensity distribution in the reception plane optimizing a spatial distribution of a parameter of interest representing the heterodyne signal.

14 Claims, 9 Drawing Sheets

(51) Int. Cl.
*G01S 7/4911* (2020.01)
*G01S 7/4912* (2020.01)

(58) Field of Classification Search
CPC .... G01S 7/4814; G01S 7/4816; G01S 7/4818; G01S 7/491; G01S 7/4914; G01S 7/497; G01S 17/36; G01S 17/894
USPC ........................................................ 356/5.09
See application file for complete search history.

(56) References Cited

OTHER PUBLICATIONS

Aflatouni et al., "Nanophotonic coherent imager", Optics Express, vol. 23, No. 4, Feb. 2015, 9 pages.

LIDAR IMAGING SYSTEM WITH FMCW TYPE HETERODYNE DETECTION COMPRISING A DEVICE FOR CORRECTING THE PHASE OF THE REFERENCE SIGNAL

TECHNICAL FIELD

The field of the invention is that of LIDAR imaging systems with Frequency Modulated Continuous Wave (FMCW) heterodyne detection.

PRIOR ART

LIDAR imaging systems with heterodyne detection of the FMCW type allow a distance map of an illuminated scene to be obtained. To this end, the document by Aflatouni et al. entitled *Nanophotonic coherent imager*, Opt. Express 23 (4), 5117-5125 (2015) describes an imaging system of this type, adapted to instantaneously illuminate the entire scene and to determine the distance map of the illuminated scene.

Such an imaging system is based on the principle of heterodyne detection, in the sense that the properties of a heterodyne signal formed by the interaction between a reference signal and a signal backscattered by the scene are used. These two optical signals are coherent with each other and originate from the same optical signal, called primary signal, transmitted by an optical source.

More specifically, such an imaging system comprises:
an optical source of the coherent, continuous and frequency modulated signal, called primary signal;
an optical device for projecting part of the primary signal, called object signal, towards a scene to be instantaneously illuminated;
an optical device for transmitting part of the primary signal, called reference signal, towards a matrix photodetector;
the optical imaging device, adapted to receive part of the object signal then backscattered by the illuminated scene and to transmit it in order to thus form the image of the illuminated scene on the matrix photodetector;
the matrix photodetector, adapted to receive the backscattered object signal and the reference signal, which interfere in order to form a heterodyne signal.

The primary signal exhibits instantaneous frequency variation (called chirp), with, for example, a start frequency $f_0$ and with a band B with a period T. The chirp signal is a sine wave, the instantaneous frequency of which in this case changes linearly over time.

The matrix photodetector receives the backscattered object signal, which is an attenuated and delayed response of the object signal with a delay $\tau$. The delay is expressed by a difference in frequency $f_b$ between the two signals in the interval $[\tau; T]$, with $T \gg \tau$, namely between the reference signal and the backscattered object signal.

This frequency $f_b$, called beat frequency, is equal to the difference between the frequency of the object signal (and therefore the reference signal) and the backscattered object signal. It is then possible to determine, on the basis of this beat frequency $f_b$, the distance D between the illuminated scene and the matrix photodetector.

LIDAR imaging systems are also known such as those described in documents US 2015/177380 A1 and US 2020/256995 A1.

However, the spatial intensity distribution of the backscattered object signal can have laser granularity, or speckle grains, and thus have a speckle pattern. Therefore, the intention is to improve the performance capabilities of the imaging system.

DISCLOSURE OF THE INVENTION

The aim of the invention is to overcome at least some of the disadvantages of the prior art and, more specifically, to propose a LIDAR imaging system with heterodyne detection of the FMCW type, the performance capabilities of which are improved even when the backscattered object signal has a speckle pattern. The performance capabilities can result in the heterodyne signal detected by the detection pixels having better quality in terms of the intensity of the heterodyne signal (direct and alternating components), of the intensity of the alternating component of the heterodyne signal alone, and even of its signal-to-noise ratio, for example.

To this end, the subject matter of the invention is a LIDAR imaging system of the FMCW type, comprising:
a coherent light source adapted to emit a continuous frequency modulated primary signal;
an optical device for projecting part of the primary signal, called object signal, onto a scene to be instantaneously illuminated;
an optical device for transmitting part of the primary signal, called reference signal, to an optical imaging device;
the optical imaging device being adapted to receive part of the object signal backscattered by the scene, called backscattered object signal, having a speckle pattern;
a matrix photodetector comprising a matrix of detection pixels, each intended to receive, in a reception plane conjugated with the scene by the optical imaging system, the backscattered object signal and the reference signal that form a heterodyne signal having a frequency, called beat frequency, representing a distance between the matrix photodetector and the illuminated scene.

According to the invention, the imaging system comprises a phase correction device, comprising:
a spatial phase modulator, arranged on the path of the reference signal upstream of the optical imaging device, adapted to apply a spatial phase distribution, called corrected spatial phase distribution, to the reference signal;
a computation unit connected to the matrix photodetector and to the spatial phase modulator and adapted to:
determine an optimal corrected spatial phase distribution to be applied to the reference signal by the spatial phase modulator,
as a function of a first spatial distribution representing a spatial intensity distribution of the backscattered object signal in the reception plane, detected by the matrix photodetector,
so that the reference signal has a spatial intensity distribution, called corrected spatial intensity distribution, in the reception plane optimizing a spatial distribution of a parameter of interest representing the heterodyne signal, selected from among the intensity of the heterodyne signal, an intensity of an alternating component of the heterodyne signal, or a signal-to-noise ratio.

Some preferred but non-limiting aspects of this imaging system are as follows.

The detection pixels can have a lateral dimension that is less than $2 \times \lambda \times NO$, where $\lambda$ is the wavelength of the backscattered object signal and where NO is a number of apertures of the optical imaging device.

The optical projection and transmission devices can comprise free space optical elements.

The spatial phase modulator can be a liquid crystal phase modulator.

The optical projection device can comprise guided optic optical elements produced in a functionalized substrate, including a diffraction gratings matrix adapted to receive the primary signal via a waveguide and to project the object signal out of the functionalized substrate.

The phase correction device can comprise guided optic optical elements produced in said functionalized substrate, the spatial phase modulator comprising a diffraction gratings matrix adapted to receive the reference signal via a waveguide and to project it out of the functionalized substrate after having applied the corrected spatial phase distribution thereto.

The optical transmission device can comprise free space optical elements adapted to transmit the reference signal projected by the spatial phase modulator towards the optical imaging device.

The matrix of detection pixels is produced in or on said functionalized substrate.

The optical transmission and imaging devices can be adapted to transmit the reference signal and the backscattered object signal towards the matrix photodetector along the same optical axis.

The optical imaging device can comprise at least one free space optical element and an aperture diaphragm, thus defining, with respect to the matrix photodetector, a field of view, as well as a central zone laterally demarcated by rays at the edge of the unvignetted field backscattered object signal that propagate up to detection pixels, called end pixels, located at the edge of the detection matrix.

The optical transmission device and the optical imaging device can be adapted to form an image of the reference signal in an intermediate plane orthogonal to the optical axis of the optical imaging device, thus forming an equivalent light source of the reference signal. The equivalent light source can be contained in the central zone of the rays at the edge of the unvignetted field backscattered object signal. The equivalent light source can have, at each point, an emission angle for the reference signal that is at least equal to said field of view of the optical imaging device.

The equivalent light source can have a lateral dimension that is at least equal to that of the central zone of the rays at the edge of the unvignetted field backscattered object signal.

The invention also relates to a method for determining a distance map of the scene using an imaging system according to any one of the preceding features, wherein the parameter of interest is the intensity of the heterodyne signal, the method comprising the following steps:
- a/ projecting, by the optical projection device, the object signal towards the scene in order to instantaneously illuminate the scene;
- b/ detecting, by the matrix photodetector, the first spatial intensity distribution of an incident optical signal representing the backscattered object signal;
- c/ determining, by the computation unit, the corrected spatial phase distribution to be applied to the reference signal by the spatial phase modulator;
- d/ applying, by the spatial phase modulator, the corrected spatial phase distribution to the reference signal;
- e/ detecting, by the matrix photodetector, a spatial intensity distribution of the heterodyne signal;
- f/ determining, by the computation unit, the spatial distribution of the parameter of interest, on the basis of the detected spatial intensity distribution of the heterodyne signal;
- repeating, if applicable, steps c/ to f/ by modifying the corrected spatial phase distribution until a determination criterion that is a function of the spatial distribution of the parameter of interest reaches a predefined threshold value;
- g/determining the distance map when the determination criterion reaches the predefined threshold value.

The determination method can comprise:
- during step b/, suspending the transmission of the reference signal, so that the incident optical signal is the backscattered object signal;
- during step c/, determining the corrected spatial phase distribution, so that the spatial intensity distribution of the reference signal in the reception plane is substantially equal to the spatial intensity distribution of the detected backscattered object signal, on the basis of a predefined transfer function expressing the spatial intensity distribution of the reference signal in the reception plane as a function of a spatial phase distribution applied by the spatial phase modulator;
- during step d/, the transmission of the reference signal no longer being suspended.

The determination method can comprise:
- during step b/, the detected optical signal being the heterodyne signal;
- steps c/ to f/ being repeated, with the spatial phase distribution being modified as a function of the optimization criterion in the previous iteration, as a function of a predefined optimization algorithm, until the optimization criterion reaches the predefined threshold value, thus optimizing the spatial distribution of the parameter of interest.

BRIEF DESCRIPTION OF THE DRAWINGS

Further aspects, aims, advantages and features of the invention will become more clearly apparent from reading the following detailed description of preferred embodiments thereof, which are provided by way of a non-limiting example, and with reference to the accompanying drawings, in which:

FIG. 7A: for two detection pixels that are opposite and are located on the edge of the detection matrix: the end rays of the backscattered object signal, and the end rays of an equivalent light source of the reference signal;

FIG. 7B: the rays at the edge of the unvignetted field of the backscattered object signal highlighting a central zone located in the vicinity of the aperture diaphragm;

FIG. 7C: for a detection pixel located on the edge of the detection matrix: the end rays of the backscattered object signal and the end rays of an equivalent light source of the reference signal, with this being located upstream of the aperture diaphragm;

FIG. 7D: the same rays as those shown in FIG. 7C, in the case whereby the equivalent light source is located in the plane of the aperture diaphragm.

DETAILED DISCLOSURE OF PARTICULAR EMBODIMENTS

In the figures and throughout the remainder of the description, the same reference signs represent identical or similar elements. Furthermore, the various elements are not shown so as to promote the clarity of the figures. Moreover, the various embodiments and variants are not exclusive from each other and can be combined together. Unless otherwise stated, the terms "substantially", "approximately", "of the order of" mean to the nearest 10%, and preferably to the nearest 5%. Moreover, the terms "ranging between . . . and . . . " and equivalent terms mean that the limits are inclusive, unless otherwise stated.

The invention relates to a LIDAR imaging system with heterodyne detection of the Frequency Modulated Continuous Wave (FMCW) type. It can be produced in a free space optical configuration and/ or in a guided optic configuration.

The imaging system is called a "LIDAR" (Light Detection and Ranging) system insofar as it is adapted to provide a map of the distance (or distance image) to a scene illuminated by a coherent optical signal. Within the scope of the invention, the imaging system illuminates the entire scene instantaneously using a continuous optical signal, and simultaneously acquires the image of the illuminated scene in order to determine the distance. The imaging system according to the invention thus differs from LIDAR systems (of the Time of Flight (TOF) measurement type or even of the FMCW type), in which the scene is "scanned", i.e. spatially scanned by an optical signal.

Furthermore, the imaging system is referred to as 'with heterodyne detection' insofar as, in order to determine the distance to the illuminated scene, a frequency, called beat frequency, is determined of a heterodyne signal formed by the interaction between a reference signal of a local oscillator and a signal backscattered by the illuminated scene, with these two optical signals being coherent with each other. The reference signal and the signal projected onto the scene both actually originate from the same primary optical signal emitted by the optical source. The heterodyne detection is of the FMCW type insofar as the primary signal is a continuous and frequency modulated signal.

Figure 1A:
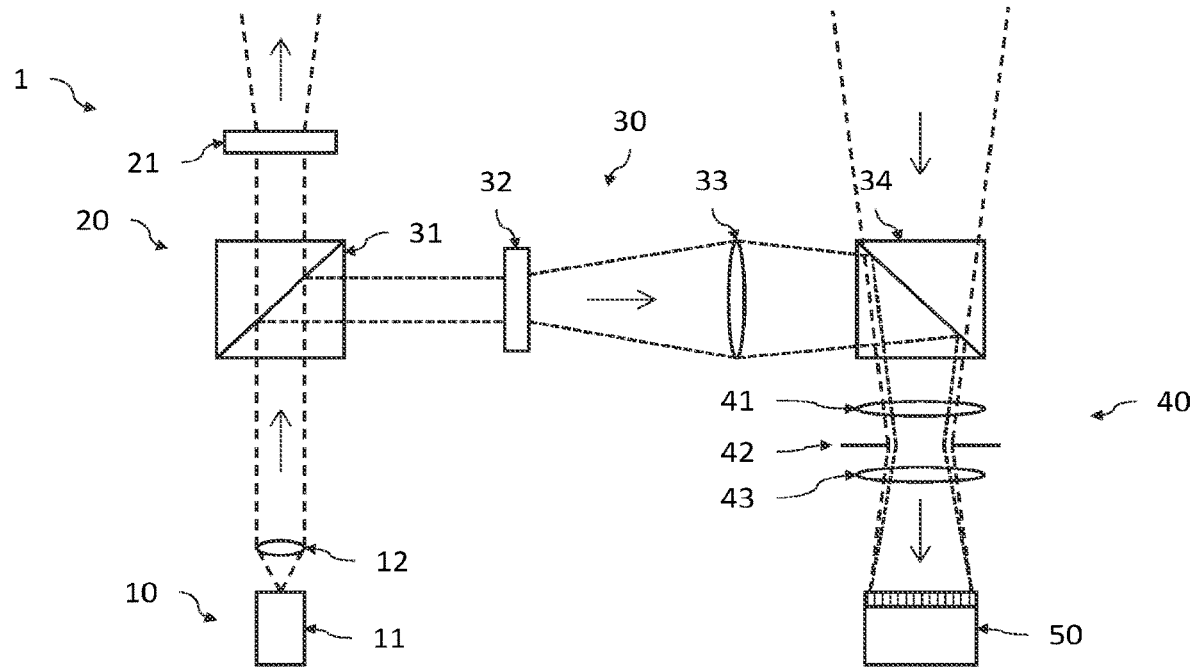
FIGS. 1A and 1B are schematic and partial views of two examples of an imaging system allowing a distance map to be obtained of the entire illuminated scene, in a free space optical configuration (FIG. 1A) and in a guided optic configuration (FIG. 1B)
Figure 1B:
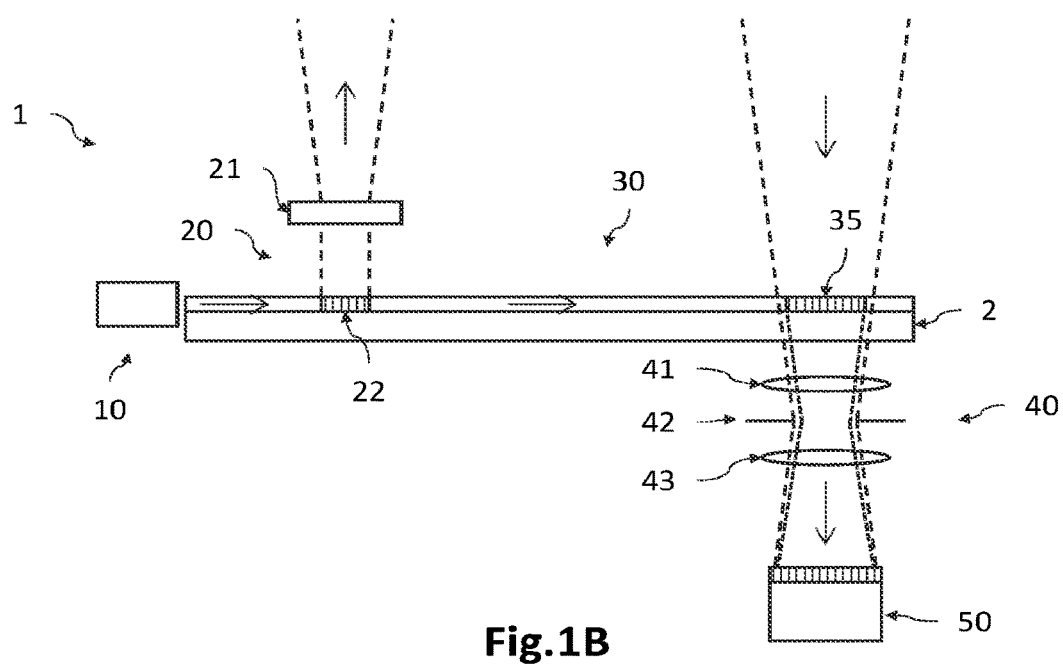

FIGS. 1A and 1B are schematic and partial views of a LIDAR imaging system 1 with heterodyne detection of the FMCW type, adapted to determine a distance image of a scene instantaneously illuminated by a continuous and frequency modulated optical signal. The imaging system 1 in this case has a free space configuration (FIG. 1A) or a guided optic configuration (FIG. 1B). In this case, examples provided by way of an illustration are involved, with it being understood that combinations and variants of these configurations are possible.

The imaging system can be of the global shutter type where all the detection pixels are read at the same time. The imaging system can then provide an instantaneous distance image. By way of a variant, it can be of the rolling shutter type, and therefore can involve sequential reading of the detection pixels, for example, row-by-row, where all the detection pixels of the same row are read simultaneously.

In general, the imaging system 1 comprises:
- an optical source 10 of a coherent, continuous and frequency modulated signal, called primary signal;
- an optical device 20 for projecting part of the primary signal, called object signal, towards a scene to be instantaneously illuminated;
- an optical device 30 for transmitting part of the primary signal, called reference signal, towards a matrix photodetector 50, with this optical device being advantageously adapted to form an equivalent light source of the reference signal located in a predefined zone at or in the vicinity of an aperture diaphragm of an optical imaging device 40;
- the optical imaging device 40, adapted to receive part of the object signal then backscattered by the illuminated scene and to transmit it in order to thus form the image of the illuminated scene on the reception plane of the matrix photodetector 50, and to transmit the reference signal;
- the matrix photodetector 50, comprising a matrix of detection pixels with indices i, j, intended to receive the backscattered object signal and the reference signal, which interact in order to form a heterodyne signal, with each detection pixel advantageously being adapted to determine a distance to the illuminated scene on the basis of the beat frequency of the detected heterodyne signal.

The imaging system 1 comprises an optical source 10 of a coherent, continuous and frequency modulated signal, called primary signal. The optical source 10 preferably is a laser source emitting a continuous primary signal. By way of an example, the primary signal can have an optical frequency located in the infrared domain.

Moreover, the primary signal is frequency modulated, for example, in this case linearly, on the basis of a start frequency $f_o$ over a repetition period T with a bandwidth B. In this case, the signal is a chirp signal, i.e. a sine wave, the instantaneous frequency of which changes linearly over time. By way of an example, the primary signal can be expressed as follows:

$$s^{ref}(t) = A^{ref} e^{2\pi j \left(f_0 t + \frac{B}{2T} t^2\right)}$$

The optical source 10 has a coherence length that typically is greater than the difference in the optical path between the reference channel and the object channel. The reference channel is the path followed by the reference signal between the optical source 10 and the matrix photodetector 50. The object channel is the path followed by the object signal from the optical source 10 to the scene, and the path followed by the object signal backscattered by the scene to the matrix photodetector 50. This difference in the optical path can correspond, in the first instance, to twice the maximum distance between the imaging system 1 and the scene.

The optical source 10 thus can comprise, in the case of an emission in the near infrared domain (between 0.7 and 2 μm), a laser source 11 of the Vertical-Cavity Surface Emitting Laser (VCSEL) type, which generally has a coherence length of the order of one metre, or even a laser source of the Edge Emitting Laser (EEL) type, which can have a coherence length of the order of ten or even one hundred metres.

Passive optical elements can be located on the optical path of the primary signal, between the optical source 10 and the optical projection device 20. Thus, in the example of FIG. 1A, a shaping lens 12 can be located at the outlet of the optical source 10, and can allow the optical beam to be collimated whilst enlarging its lateral dimension, for example, to a diameter of a few millimetres. Moreover, a spatial filtering device can be present in order to remove the high spatial frequencies. Thus, the primary signal propagates in a collimated manner, with a Gaussian profile and with a diameter of the order of a few millimetres, for example, 5 mm.

The imaging system 1 then comprises an optical projection device 20 adapted to project part of the primary signal towards a scene that is to be instantaneously illuminated. A "scene" is understood to be the scene illuminated by the object signal. This projected part of the primary signal is called object signal. Thus, the entire scene is instantaneously illuminated by the object signal, which therefore has an angular aperture capable of instantaneously illuminating the entire scene. Preferably, the scene is also evenly illuminated, i.e. the object signal has an intensity, the angular distribution of which is constant.

The optical projection device 20 or the optical transmission device 30 in this case comprise at least one optical element adapted to divide the primary signal into an object signal, on the one hand, and a reference signal, on the other hand. In the example of FIG. 1A, it can involve, for example, a semi-reflective strip or a splitter cube. In this case, the splitter cube 31 transmits part of the primary signal, which becomes the object signal, and reflects part of the primary signal, which becomes the reference signal. The intensity distribution of the object signal and of the reference signal preferably is unequal, and thus can be 90% for the object signal and 10% for the reference signal. In the case of FIG. 1B, the same functionalized substrate comprises an input waveguide coupled to the optical source 10, which extends up to a first diffraction gratings matrix 22 projecting the object signal towards the scene, and up to a second diffraction gratings matrix 35 projecting the reference signal towards the matrix photodetector 50.

In order to instantaneously, and in this case evenly, illuminate the scene, the optical projection device 20 shapes the object signal. To this end, it comprises at least one optical element 21 adapted to make the object signal divergent. The angular aperture of the object signal is such that the entire scene is evenly illuminated by the object signal. It is preferably substantially equal to the field of view of the optical imaging device 40 (for example, equal to approximately 20'). Moreover, it can comprise at least one optical element adapted to make the angular distribution of the intensity constant, in order to obtain a flat profile of the intensity, and no longer a Gaussian profile. Of course, the various optical elements can be separate or coincident.

In the examples of FIGS. 1A and 1B, a diffuser 21 (for transmission) is arranged at the outlet of the splitter cube 31 or of the first diffraction gratings matrix 22 so that the intensity profile of the object signal transitions from a Gaussian profile to a flat profile. Moreover, the same diffuser 21 in this case makes the object signal divergent. A lens (not shown) can be located downstream of the diffuser (or upstream of the diffuser), so that the angular aperture has a predefined value, in this case a value substantially equal to the field of view of the optical imaging device 40.

The imaging system 1 further comprises an optical transmission device 30 adapted to transmit part of the primary signal towards the matrix photodetector 50. This transmitted part of the primary signal is called reference signal. The transmitted reference signal corresponds, within the context of heterodyne detection, to the signal of a Local Oscillator (LO).

In this example, the optical transmission device 30 is adapted so that the reference signal evenly illuminates the matrix detector 50. To this end, in the example of FIG. 1A, in this case it comprises a diffuser 32, located downstream of the splitter cube 31, adapted to make the angular distribution of the intensity constant, in order to thus obtain a flat profile of the intensity of the reference signal, and no longer a Gaussian profile. In the example of FIG. 1B, the second diffraction gratings matrix 35 is configured so that the spatial intensity distribution of the reference signal is even. Of course, the spatial intensity distribution of the reference signal may not be even and then can have a different profile, for example, a Gaussian profile.

Moreover, the optical transmission device 30 is adapted so that all the detection pixels of the matrix photodetector 50 receive the reference signal. This is linked to the fact that all the detection pixels also receive the backscattered object signal. Furthermore, the heterodyne signal forms at each detection pixel, so that a distance image can be determined on the basis of the entire matrix of detection pixels. In the example of FIG. 1A, the optical transmission device 30 comprises at least one convergent lens 33, arranged downstream of the diffuser 32, allowing the optical beam of the reference signal to be shaped as a predefined angular aperture. This is previously defined, taking into account various optics of the optical imaging device 40, so that the reference signal effectively illuminates each detection pixel. By way of a variant, the optical transmission device 30 may not comprise a lens allowing all the detection pixels to be illuminated. The diffuser 32 simply needs to be positioned correctly, taking into account its diffusion cone, the diameter of the incident reference signal on the diffuser 32, the aperture of the optical imaging device 40 and the size of the detection matrix of the photodetector 50. In the case of the example of FIG. 1B, the diffraction gratings of the second matrix 35 are designed so that it has an angular aperture allowing all the detection pixels to be illuminated.

Preferably, the diffuser 32 and the reception plane of the matrix photodetector 50 are not conjugated, to thus prevent the image of the diffuser 32 from forming on the matrix photodetector 50, which could degrade the quality of the heterodyne signal to be detected. However, the diffuser 32 can be conjugated on a plane, called intermediate plane, located at or in the vicinity of the aperture diaphragm of the optical imaging device 40, so as to form an equivalent light source 36 of the reference signal, as explained in detail with reference to FIGS. 7A to 7D.

The imaging system 1 further comprises an optical imaging device 40 adapted to receive part of the object signal backscattered by the scene, called backscattered object signal, and to transmit it towards the matrix photodetector 50. It is particularly adapted to form the image of the illuminated scene on the reception plane of the matrix photodetector 50. Furthermore, the illuminated scene and the reception plane of the matrix photodetector 50 are conjugated, to the nearest depth of field.

The backscattered object signal $s^{or}(t)$ has a delay $\tau$ relative to the object signal $s^{o}(t)$. It can be expressed thus, in the case whereby the frequency shift $f_D$ of the scene likely to be injected into the backscattered object signal $S^{or}(t)$ is considered to be zero ($f_D=0$):

$$s^{or}(t) = A^{or} e^{2\pi j \left( f_0(t-\tau) + \frac{B}{2T}(t-\tau)^2 \right)}$$

The optical imaging device 40 or the optical transmission device 30 in this case comprise at least one optical element adapted to combine the backscattered object signal and the reference signal, i.e. to transmit them towards the matrix photodetector 50 along the same optical axis. It can involve, in the example of FIG. 1A, a semi-reflective strip or a combiner cube 34. In this case, a combiner cube 34 reflects the reference signal towards the matrix photodetector 50 along the optical axis, and transmits the backscattered object signal along this same optical axis. The two optical signals therefore propagate towards the matrix photodetector 50 on a common channel, along the same optical axis. Thus, the two optical signals are able to be superimposed along the same optical axis, improving the quality of the heterodyne signal that is formed. In the case of FIG. 1B, the functionalized substrate 2, as well as the second diffraction gratings matrix 35, are transparent to the backscattered object signal, so that it is transmitted and superimposed on the reference signal. In practice, the functionalized substrate 2 transmits the backscattered object signal without actually disrupting it, insofar as the difference in refractive indices is small between the waveguides and the diffraction gratings of the reference signal, on the one hand, and the support substrate, on the other hand (thus limiting the diffraction phenomena of the backscattered object signal), and insofar as the surface of the waveguides and the diffraction gratings is small compared to the size of the incident backscattered object signal.

The optical imaging device 40 has free space optical elements, and comprises at least one lens and one aperture diaphragm 42 that defines the physical pupil. It should be noted that the aperture diaphragm 42 may not be a physical object separate from a lens, but may be defined by the profile of the lens. It comprises an optical axis orthogonal to the reception plane of the matrix photodetector 50. In this case, it is adapted to receive the backscattered object signal, as well as the reference signal, to allow them to be transmitted towards the matrix photodetector 50 along the same optical axis and to thus allow better superimposition of the two optical signals, thus improving the combination of the two optical signals by interference, which allows the intensity of the heterodyne signal to be improved. The optical imaging device 40 in this case comprises a plurality of lenses 41, 43, between which the aperture diaphragm 42 is disposed.

The imaging system 1 further comprises a matrix photodetector 50 having a matrix of detection pixels extending in a reception plane. The reception plane of the matrix photodetector 50 is located in a plane conjugated with the scene by the optical imaging device 40 (to the nearest depth of field). In other words, the image of the scene forms in the reception plane of the matrix photodetector 50. Each detection pixel is intended to receive the reference signal and the backscattered object signal, which interfere with each other to form a signal, called heterodyne signal. It can involve a photodetector of the CMOS or CCD type.

The heterodyne signal $s^{het}(t)$ originates from the interaction between the reference signal $s^{ref}(t)$ and the backscattered object signal $s^{or}(t)$. It comprises a constant component (intended to be filtered) and a periodic alternating component $AC^{het}(t)$ that forms the useful signal. This periodic alternating component can be expressed as follows:

$$AC^{het}(t) = A^{ref} A^{or} e^{2\pi j \left( \frac{B}{T}\tau t + \left( f_0 \tau - \frac{B}{2T}\tau^2 \right) \right)},$$

where the beat frequency $f_b$ is equal to $B\tau/T$, and therefore to $2BD/cT$, with c being the speed of light. Determining the beat frequency $f_b$ therefore allows the distance D between the scene and the matrix photodetector 50 to be obtained.

Figure 2A:
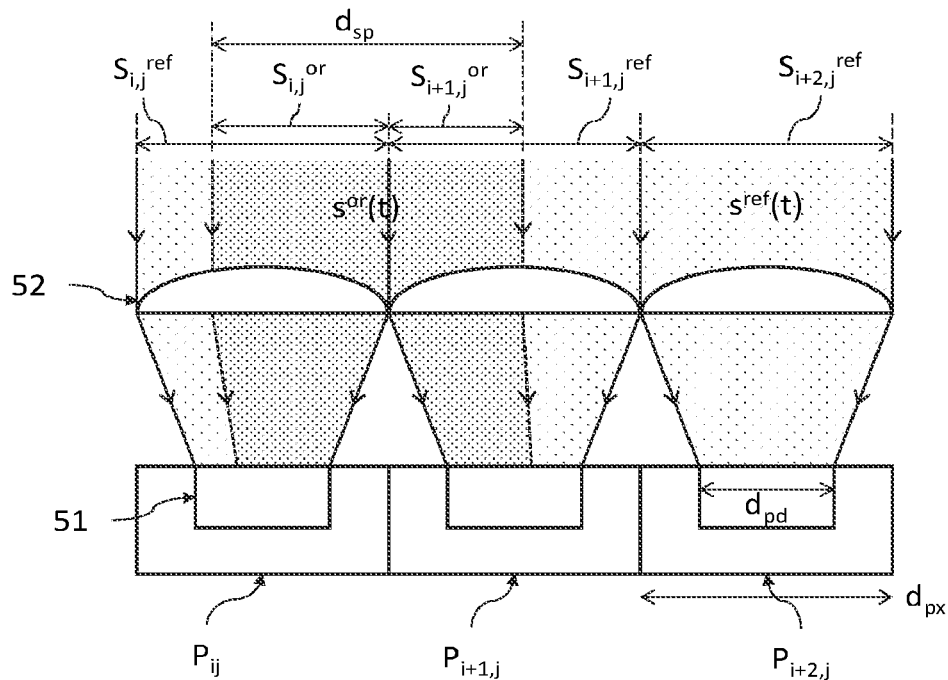
FIGS. 2A and 2B are views of some detection pixels of the imaging system shown in FIG. 1A or 1B, as a cross-section (FIG. 2A) and as a top view (FIG. 2B), showing the optical field of the reference signal, as well as that of the backscattered object signal that has a speckle pattern.
Figure 2B:
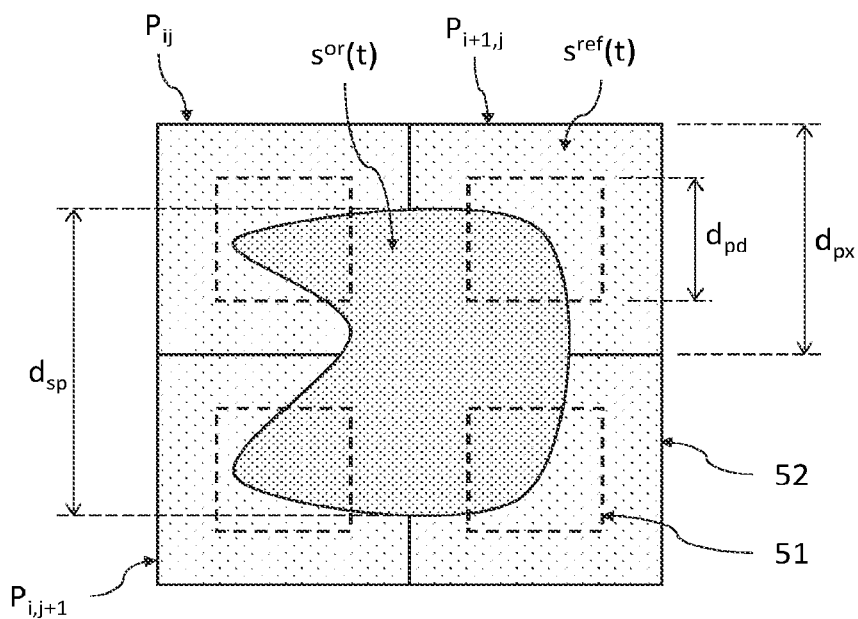

The detection pixels can be formed by a microlens arranged opposite a photodiode. As shown in FIGS. 2A and 2B, each detection pixel has a lateral dimension $d_{px}$ defined by the size of the microlenses, whereas the photosensitive zone of the photodiodes has a lateral dimension $d_{pd}$. In this case, the detection plane is considered to be the plane in which the microlenses extend.

The detection pixels are advantageously adapted to determine the beat frequency of the detected heterodyne signal. To this end, each pixel comprises a photodiode, for example, of the pn, pin or avalanche type, and an optical-electrical conversion device so as to convert the detected heterodyne signal into an electrical signal, for example, an electrical voltage. The conversion device can comprise a filter for filtering the direct component $DC^{het}$ of the detected heterodyne signal $s^{het}(t)$ and only keeping the alternating component $AC^{het}$, an amplifier of the amplitude of the filtered heterodyne signal, a detector and counter of the periodic variations of the filtered heterodyne signal, in order to thus determine a value of the beat frequency of the heterodyne signal. The frequency value determined by each detection pixel then can be transmitted to a computing unit, which derives a distance map therefrom. The beat frequency can be determined simultaneously for all the detection pixels, so as to obtain an instantaneous distance map (distance image) of the scene that is then illuminated (global shutter approach). As previously mentioned, the imaging system 1 can also have a rolling shutter operation.

Thus, during operation, the optical source 10 emits the coherent, continuous and frequency modulated primary signal, part of which (object signal) is projected by the optical projection device 20 onto the scene in order to illuminate it instantaneously. The optical transmission device 30 transmits part (reference signal) of the primary signal towards the matrix photodetector 50. The optical imaging device 40 receives the backscattered object signal and forms the image of the illuminated scene on the matrix of detection pixels. In this case, it also receives the reference signal, which is transmitted towards the matrix of detection pixels. The reference signal $s^{ref}(t)$ and the backscattered object signal sit) interfere and form a heterodyne signal $s^{het}(t)$ at each detection pixel. Each of the detection pixels subsequently determines the beat frequency $f_b$ of the detected heterodyne signal, and the distance map of the illuminated scene is subsequently determined.

FIGS. 2A and 2B schematically show examples of the optical fields (spatial intensity distributions) of the reference signal $s^{ref}(t)$ and of the backscattered object signal sit), at some of the detection pixels $P_{ij}$ of the matrix photodetector 50. FIG. 2A is a cross-sectional view, and FIG. 2B is a top view in the case whereby the speckle grains have a lateral dimension that is greater than that of the detection pixels. Of course, the speckle grains can have a lateral dimension that is less than that of the detection pixels, without departing from the scope of the invention.

Several detection pixels $P_{ij}+P_{i+1,j}$, $P_{i+2,j}$, are shown herein in FIG. 2A (and $P_{ij}$, $P_{i+1,j}$, $P_{i,j+1}$ in FIG. 2B). They each comprise a microlens 52 arranged opposite a photodiode 51. The microlenses 52 in this case are contiguous and have a lateral dimension $d_{px}$ (which in this case defines the lateral dimension of the detection pixels), and the photodiodes 51 (effective detection zone of the incident photons) have a lateral dimension $d_{pd}$, with this dimension $d_{pd}$ in this case being less than the dimension $d_{px}$. The reception plane of the matrix photodetector 50 is considered to correspond to the plane of the matrix of microlenses 52.

The reference signal $s^{ref}(t)$ can have an optical field such that the entire detection matrix, and thus the entire surface of each detection pixel, is instantaneously evenly illuminated. However, the backscattered object signal $s^{or}(t)$ can have a speckle pattern, i.e. a spatial intensity distribution $I^{or}(t)$ exhibiting laser granularity, hereafter called speckle grains. This speckle pattern originates from the fact that the scene is a scattering object illuminated with coherent light. The various rays of the backscattered optical signal $s^{or}(t)$ therefore interfere with each other, thus forming a speckle pattern formed by several speckle grains (bright zones) surrounded by dark zones. The speckle grains are randomly phase-shifted from each other. More specifically, the backscattered object signal sit) has the same frequency, but uneven spatial phase distribution: the phase is substantially constant in each of the speckle grains, but is randomly different from one speckle grain to another.

The speckle grains have an average lateral dimension $d_{sp}$ that is of the order of $2 \times \lambda \times NO$, where X is the wavelength of the backscattered object signal $s^{or}(t)$ (equal to that of the primary signal and the reference signal, for example, in the visible or near infrared domains), and NO is the number of apertures $NO=f_{di}/d_{do}$ of the optical imaging device 40. In this case, $f_{di}$ is the focal length and $d_{do}$ is the lateral dimension (for example, the diameter) of the diameter of the entrance or exit pupil of the optical imaging device 40. Thus, depending on the number of apertures NO and the lateral dimension $d_{px}$, the speckle grains can extend over one or more detection pixels, as shown in FIG. 2B, or over less than one detection pixel. It is advantageous for the speckle grains to be larger than the detection pixels, so as to improve the detection of the heterodyne signal, and to prevent the presence of several speckle grains in the same detection pixel from disrupting the determination of the beat frequency $f_b$ (due to a phase-shift between these speckle grains). Furthermore, the number of apertures can be high, for example, at least 2, and the size of the detection pixels can be at most 10 μm.

It should be noted that the optical field of the reference signal, the optical intensity of which is spatially even at the instant t, is much different to that of the backscattered object signal, which is characterized by the speckle pattern. It should be noted that these figures are schematic in this case in order to promote clarity. Thus, the size of a speckle grain does not decrease following transmission through the microlenses 52, insofar as it relates to diffractive optics and not to geometrical optics. In other words, a speckle grain has substantially the same size, whether the plane of the microlenses 52 or the plane of the photodiodes 51 is considered.

A spatial distribution $S_{ij}^{or}(t)$ (geometrical distribution) of the speckle grains of the backscattered object signal $s^{or}(t)$ in a detection pixel $P_{ij}$ at the reception plane will now be defined. It assumes a zero or practically zero local value when the considered detection pixel is located in a dark zone of the speckle pattern. Furthermore, it has a non-zero value when a speckle grain is present in the considered detection pixel. In the same way, a spatial distribution $S_{ij}^{ref}(t)$ of the bright zones of the reference signal in the reception plane is defined. In the case of FIGS. 2A and 2B, this spatial distribution $S_{ij}^{ref}(t)$ is even and has the same non-zero value at each detection pixel in the reception plane.

However, it would appear that this difference between the spatial distribution $S_{ij}^{or}(t)$ of the speckle grains of the backscattered object signal sit) and the spatial distribution $S_{ij}^{ref}(t)$ of the bright zones of the reference signal $s^{ref}(t)$ can affect the performance capabilities of the imaging system 1, and in particular can affect the quality of the heterodyne signal detected at each detection pixel in terms of detected intensity (direct and alternating components), of intensity of the alternating component alone, and/ or of the signal-to-noise ratio, for example.

Indeed, within the context of heterodyne detection, the reference signal allows the backscattered object signal to be amplified. The useful part of the heterodyne signal $s^{het}(t)$, namely the intensity of its alternating component $AC_{ij}^{het}(t)$ for a detection pixel $P_{ij}$, is of the order of $$\sqrt{(E_{ij}^{ref} \times E_{ij}^{or})} = \sqrt{\left(\frac{F_{ij}^{ref}}{s_{ij}^{ref}} \times \frac{F_{ij}^{or}}{s_{ij}^{or}}\right)},$$

where $E_{ij}=F_{ij}/S_{ij}$ is the local illumination, with $F_{ij}$ being the luminous flux (number of photons) of the incident signal on an illuminated surface $S_{ij}$ of the detection pixel $P_{ij}$.

However, if, for example, the detection pixels $P_{ij}$, $P_{i+1,j}$, $P_{i,j+1}$, $P_{i+1,j+1}$ shown in FIG. 2B are considered, the speckle grain, the surface of which is of the order of $(2 \times \lambda \times NO)^2$, in this case illuminates the surfaces $S_{ij}^{or}(t)$, $S_{i+1,j}^{or}(t)$, $S_{i,j+1}^{or}(t)$, and $S_{i+1,j+1}^{or}(t)$, which are each of the order of a quarter of the surface $(d_{px})^2$ of each detection pixel. By contrast, the reference signal $s^{ref}(t)$ illuminates the entire surface of the detection pixels, so that the surfaces $S_{ij}^{ref}(t)$, $S_{i+1,j}^{ref}(t)$, $S_{i,j+1}^{ref}(t)$, and $S_{i+1,j+1}^{ref}(t)$ are each equal to $(d_{px})^2$. Therefore, it can be seen that even illumination of the detection pixels by the reference signal $s^{ref}(t)$ is expressed by sub-optimal intensity of the alternating component $AC_{ij}^{het}(t)$ of the heterodyne signal, insofar as the spatial distribution $S_{ij}^{ref}(t)$ is even and does not take into account the spatial distribution $S_{ij}^{or}(t)$ of the speckle grains. Therefore, this also affects the intensity $I_{ij}^{het}(t)$ but also the signal-to-noise ratio $SNR_{ij}^{het}(t)$, which can be defined as $AC_{ij}^{het}(t)/\sqrt{(AC_{ij}^{het}(t)+DC_{ij}^{het}(t))}$. Indeed, it would appear that part of the reference signal is unintentionally used to amplify dark zones of the backscattered object signal.

Furthermore, within the scope of the invention, the intention is to modify the spatial intensity distribution $I_{ij}^{ref}(t)$ of the reference signal, by taking into account the spatial intensity distribution $I_{ij}^{or}(t)$ of the backscattered object signal, in order to optimize the spatial distribution of a parameter of interest representing the heterodyne signal, for example, its intensity (alternating component and direct component), the intensity of its alternating component alone, or even the signal-to-noise ratio.

The modification of the spatial intensity distribution $I_{ij}^{ref}(t)$ of the reference signal will then result in the formation of bright zones surrounded by dark zones, the arrangement and the shape of which depend on the spatial intensity distribution $I_{ij}^{or}(t)$ of the backscattered object signal. This equivalent "speckle pattern" of the reference signal is therefore correlated with the effective speckle pattern of the backscattered object signal. It can also be correlated with the spatial variations in reflectivity of the illuminated scene. Thus, the surface $S_{ij}^{ref}(t)$ illuminated by the bright zones of the reference signal can be substantially equal to the surface Suit) illuminated by the speckle grains of the backscattered object signal, and can be at least partially superimposed. The formation of these bright zones, by decreasing the illuminated zones $S_{ij}^{ref}(t)$, for all or some of the detection pixels, thus allows the spatial distribution of the selected parameter of interest to be optimized.

To this end, the imaging system 1 according to the invention comprises a phase correction device 60, comprising:
- a spatial phase modulator 61 (or SLM, Spatial Light Modulator), arranged on the path of the reference signal upstream of the optical imaging device 40, and adapted to apply a spatial phase distribution, called corrected spatial phase distribution $\phi_{mn}^{ref}(t)$, to the reference signal;
- a computation unit 62, connected to the photodetector and to the spatial phase modulator 61, and adapted to:
  - determine an optimal corrected spatial phase distribution $\phi_{mn}^{ref,opt}(t_i)$ to be applied to the reference signal by the spatial phase modulator 61,
  - as a function of a first spatial distribution representing a spatial intensity distribution $I_{ij}^{or}(t_i)$ of the backscattered object signal in the reception plane, detected by the matrix photodetector 50,
  - so that the reference signal has a spatial intensity distribution, called corrected spatial intensity distribution $I_{ij}^{ref,opt}(t_i)$, in the reception plane optimizing a spatial distribution of a parameter of interest representing the heterodyne signal, with this parameter of interest being selected from among the intensity $I_{ij}^{het}(t_i)$ of the heterodyne signal (direct and alternating components), an intensity of the alternating component $AC_{ij}^{het}(t_i)$ alone, or a signal-to-noise ratio $SNR_{ij}^{het}(t_i)$.

In other words, a first spatial distribution is determined that takes into account that of the backscattered object signal in the reception plane. This can involve the spatial intensity distribution $I_{ij}^{or}(t)$ of the backscattered object signal itself or the spatial intensity distribution $I_{ij}^{het}(t)$ of the heterodyne signal (in the event that only the backscattered object signal is not detected). It can also involve the spatial distribution of the alternating component $AC_{ij}(t_i)$ or that of the signal-to-noise ratio $SNR_{ij}(t_i)$, or even that of the beat frequency $f_b$. Thus, this first spatial distribution takes into account the speckle pattern of the backscattered object signal.

Subsequently, the intention is to optimize the spatial distribution of a parameter of interest that relates to the heterodyne signal. This thus can involve the intensity of the heterodyne signal (direct and alternating components), the intensity of the alternating component of the heterodyne signal, or even the signal-to-noise ratio.

To this end, the spatial phase distribution of the reference signal is modified, which thus transitions from an initial spatial distribution (for example, even) to a corrected spatial distribution (uneven), as a function of the first spatial intensity distribution (that which takes into account the speckle pattern of the backscattered object signal), in order to optimize the spatial distribution of the parameter of interest. This thus can result in the fact that the spatial intensity distribution of the reference signal tends towards that of the speckle pattern of the backscattered object signal, particularly when the parameter of interest is the intensity of the heterodyne signal (direct and alternating components). In other words, the reference signal will have bright zones, the geometrical distribution of which is correlated with that of the speckle grains of the backscattered object signal. The spatial distribution of the parameter of interest is then optimized, which improves the performance capabilities of the imaging system 1.

Figure 3A:
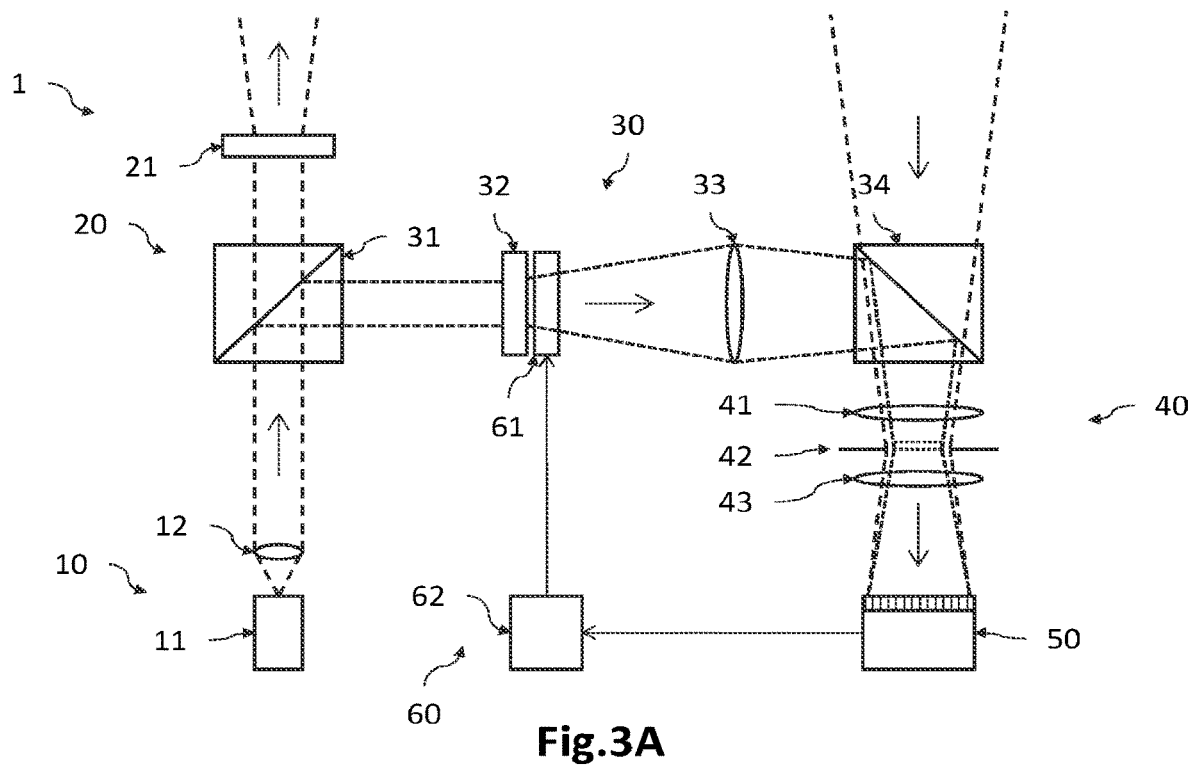
FIGS. 3A and 3B are schematic and partial views of an imaging system according to various embodiments, in which it comprises a device for correcting the phase of the reference signal, in a free space optical configuration (FIG. 3A) and in a guided optic configuration (FIG. 3B)
Figure 3B:
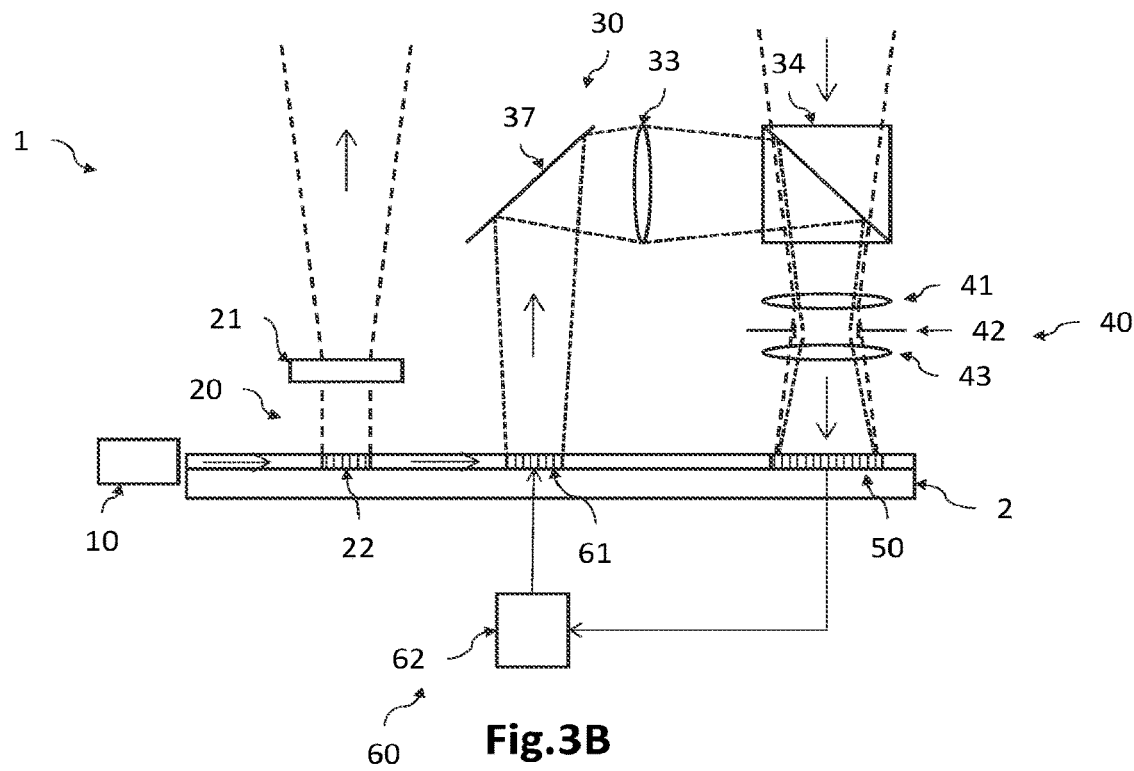

FIGS. 3A and 3B are schematic and partial views of an imaging system 1 according to various embodiments, in which it comprises such a phase correction device 60, in a free space optical configuration (FIG. 3A) and in a guided optic configuration (FIG. 3B).

FIG. 3A describes an imaging system 1 according to one embodiment, in a free space optical configuration. It differs from the one described in FIG. 1A basically in that it comprises a spatial phase modulator 61, in this case arranged on the path of the reference signal between the splitter cube 31 and the combiner cube 34, and a computation unit 62 connected to the matrix photodetector 50, on the one hand, and to the spatial phase modulator 61, on the other hand. In this example, the spatial phase modulator 61 is separate from the diffuser 32 and is arranged downstream of said diffuser. By way of a variant, it can be located upstream of the diffuser 32, or even adjacent to or coincident with said diffuser. Preferably, as described in detail hereafter, the spatial phase modulator 61 is located in a plane conjugated with an intermediate plane, which is located in a central zone defined by the rays at the edge of the unvignetted field of the backscattered object signal, in order to form an equivalent light source 36 of the reference signal (see FIGS. 7A to 7D). This allows the superimposition of the wavefront of the reference signal with that of the backscattered object signal to be improved. This thus limits the generation of interference fringes between these two incident signals, with these fringes being likely to degrade the detection of the heterodyne signal by the detection pixels.

The spatial phase modulator 61 can be a liquid crystal transmissive modulator. It can comprise a matrix of modulation pixels with the indices m, n. The number of modulation pixels can be less than or equal to a tenth of the number of detection pixels. Thus, it can be an Electrically Controlled Spatial Light Modulator (ESLM), in which the liquid crystals are arranged between two sheets of transparent material. The modulation pixels are controlled by transparent microelectronic elements, for example, Thin Film Transistors (TFT).

Figure 6A:
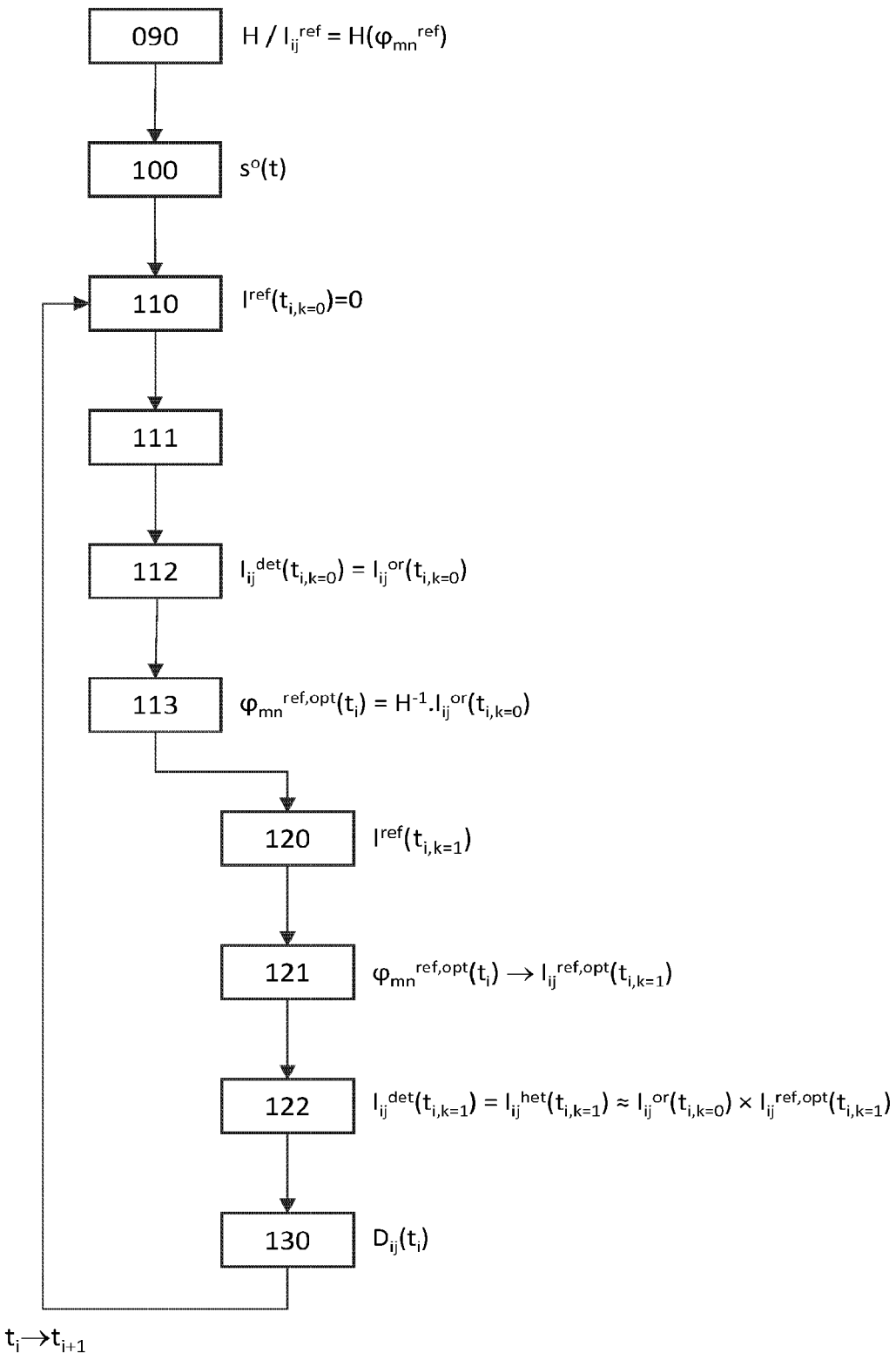
FIGS. 6A and 6B are flow charts showing steps of two methods for determining a distance map of the scene using an imaging system according to one embodiment.
Figure 6B:
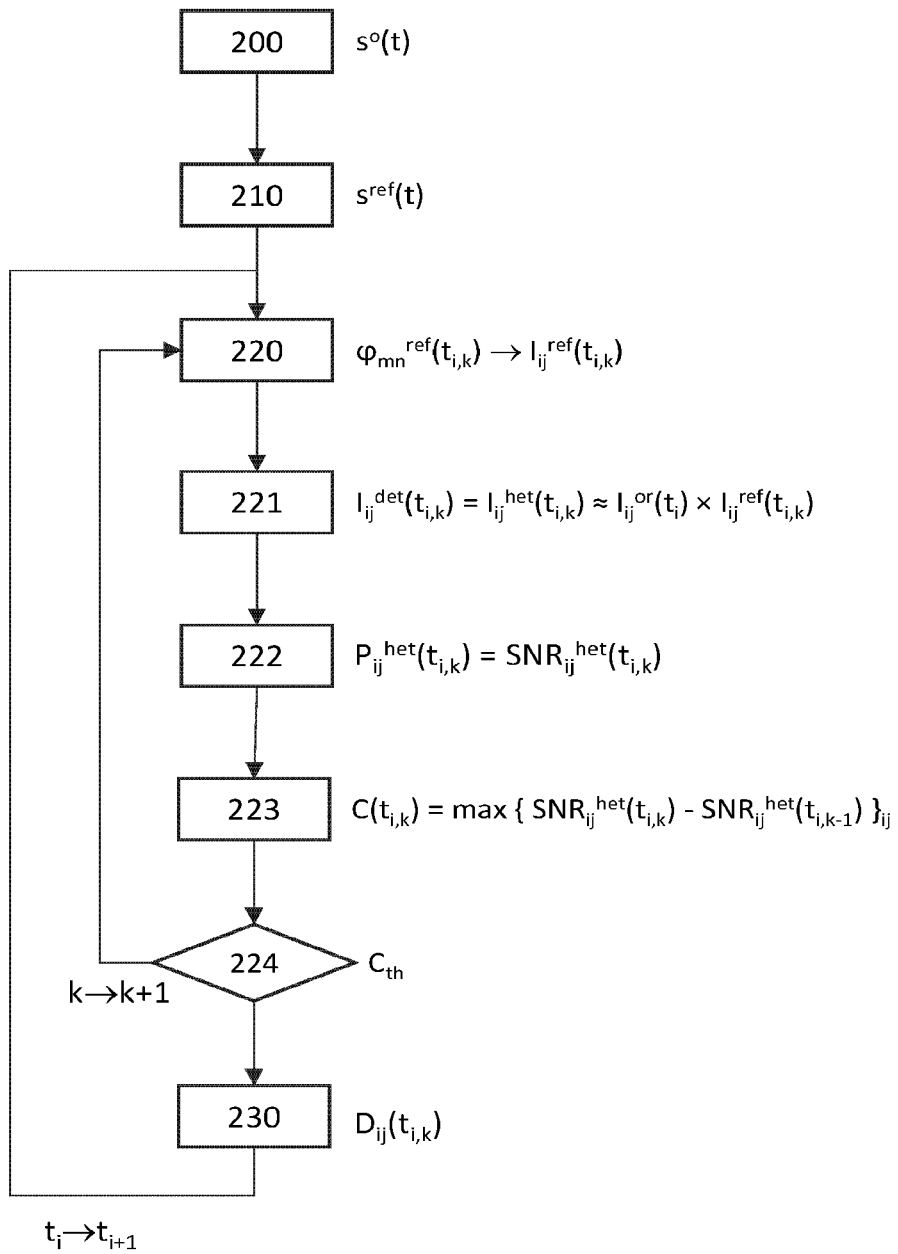

The computation unit 62 is connected to the matrix photodetector 50 and to the spatial phase modulator 61. It comprises a programmable processor capable of executing instructions stored on an information storage medium. It further comprises a memory containing the instructions required to implement the determination of the corrected spatial phase distribution $\phi_{mn}^{ref}$ to be applied to the reference signal in order to modify its spatial intensity distribution $I_{ij}^{ref}$ in the detection plane, and consequently optimize the spatial distribution of the parameter of interest representing the heterodyne signal. The memory is also adapted to store the computed information. FIGS. 6A and 6B show two examples of a method for determining a distance map of the scene using an imaging system 1 according to one embodiment, and are described hereafter.

FIG. 3B describes an imaging system 1 according to another embodiment, in a guided optic configuration. It differs from the one described in FIG. 1B basically in that the first diffraction gratings matrix 22, the spatial phase modulator 61, and the matrix photodetector 50 are produced in or on the same functionalized substrate 2 made from a semiconductor material, for example, silicon-based. However, both the optical transmission device 30 and the optical imaging device 40 comprise free space optical elements. The matrix photodetector 50 thus can be a photodetector produced in the functionalized substrate 2, as shown in FIG. 3B. In this case, this is a representation that is simplified in order to promote the clarity of the figures: indeed, the waveguides are usually very thin, of the order of a few hundred nanometres, whereas the photodiodes are produced in a semiconductive layer of the order of a few microns thick. By way of a variant, the matrix photodetector 50 can be produced from a substrate other than the substrate 2, and then transferred thereto. Still by way of a variant, it clearly can be produced in a functionalized substrate distinct and separate from the substrate 2.

The optical source 10 emits the primary signal into the waveguide of the functionalized substrate 2. This primary signal propagates to the first matrix 22 of diffraction gratings, which project part of the primary signal towards the diffuser 21. Another part of the primary signal is transmitted to the spatial phase modulator 61. This can be formed by a set of projection gratings each associated with a phase-shifter. The reference signal is then extracted from the functionalized substrate 2 towards a deflecting mirror 37, which redirects the reference signal to a lens 33 and then to the combiner cube 34. The reference signal and the backscattered object signal are subsequently transmitted by the optical imaging device 40 towards a matrix of photodiodes produced on the same functionalized substrate 2. The matrix photodetector 50 is connected to the computation unit 62, which is also connected to the spatial phase modulator 61.

Figure 4A:
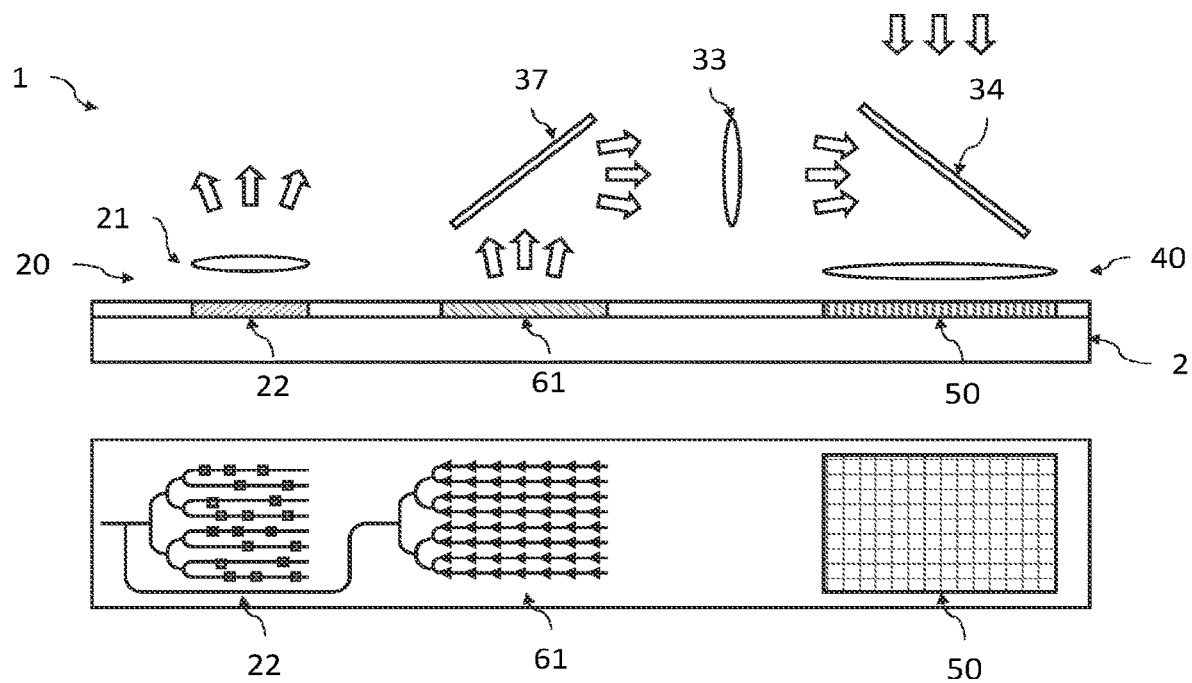
FIG. 4A schematically and partially shows part of the imaging system according to the guided optic configuration of FIG. 3B, as a section view and as a top view, and FIG. 4B schematically and partially shows, as a top view, the spatial phase modulator shown in FIG. 4A.

FIG. 4A is a detailed view of an embodiment of such a functionalized substrate 2 of the imaging system 1 of FIG. 3B. It is shown as a longitudinal section and top view. As shown in the top view, the optical projection device 20 comprises the waveguide, in which the primary signal propagates. A splitter divides the primary signal into a plurality of arms, each of which comprises several diffraction gratings for projecting the object signal towards the scene (for example, via at least one shaping lens, as shown in FIG. 4A).

Figure 4B:
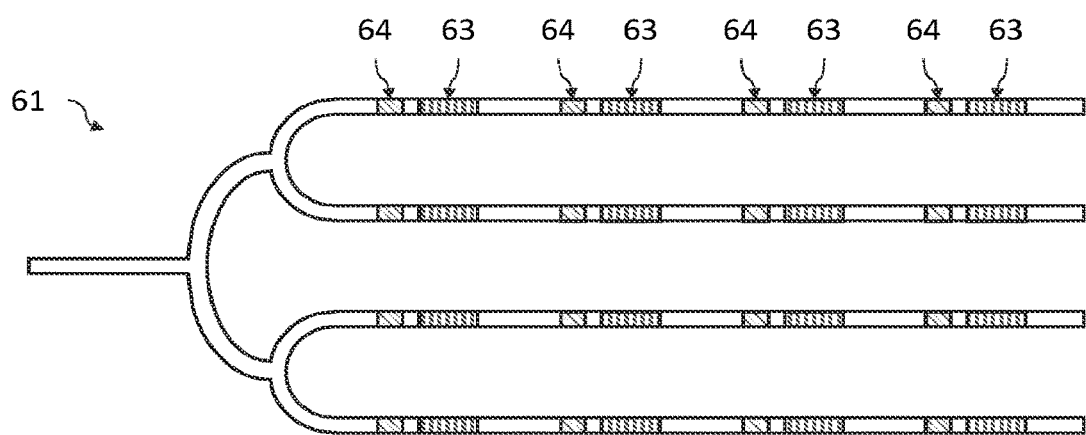

An additional arm transmits part of the primary signal towards the spatial phase modulator 61. FIG. 4B shows an example of such a guided optic modulator 61. It can be formed from a plurality of arms, each of which comprises several diffraction gratings 63. These project the reference signal towards free space optical elements of the optical transmission device 30. Each diffraction grating 63 is associated with an elementary optical phase shifter 64. This elementary optical phase shifter conventionally is of the electro-refractive effect or thermo-optical effect type.

In both cases, the phase variation is obtained by a variation of the refractive index of the material forming the core of the considered waveguide. This modification of the refractive index can be obtained by modifying the density of free carriers in the case of the electro-refractive phase-shifter, or by modifying the temperature applied to the arm in the case of the thermo-optical phase-shifter.

Figure 5A:
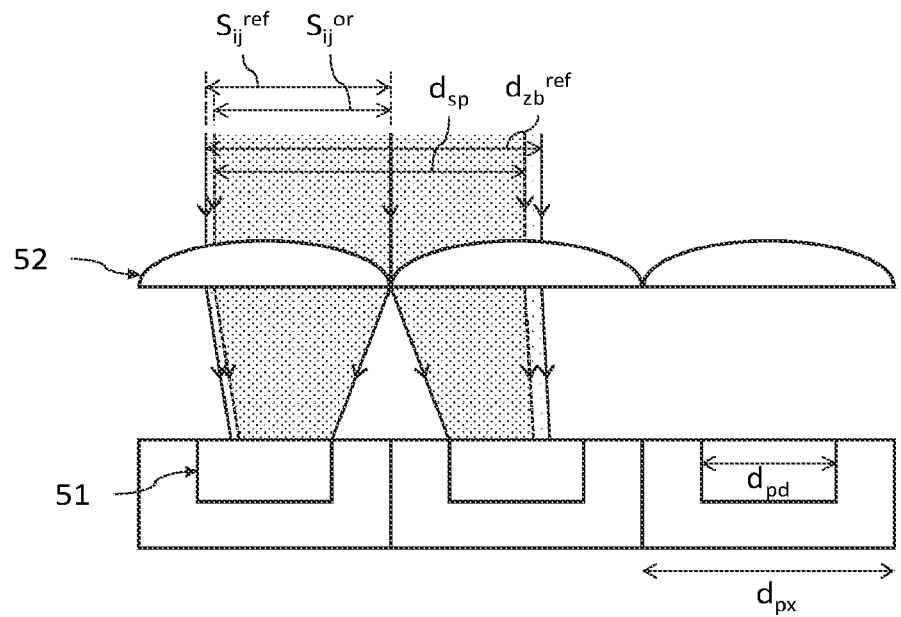
FIGS. 5A and 5B are views of some detection pixels of the imaging system according to the embodiments of FIGS. 3A and 3B, as a section view (FIG. 5A) and as a top view (FIG. 5B), showing the optical field of the reference signal having a corrected spatial phase distribution, and showing that of the backscattered object signal that has a speckle pattern.
Figure 5B:
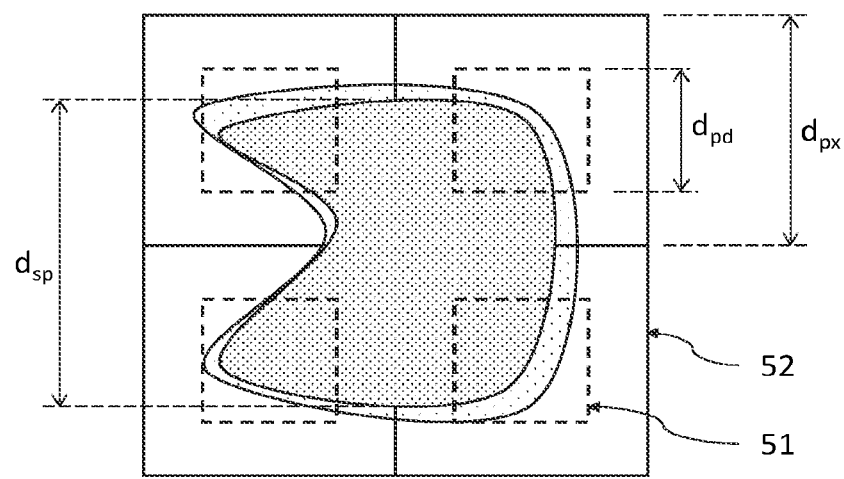

FIGS. 5A and 5B schematically show examples of the optical fields (spatial intensity distributions) of the reference signal $s^{ref}(t)$ and of the backscattered object signal sit), at some of the detection pixels of the matrix photodetector 50, in the case of an imaging system 1 according to one embodiment. In this case, the spatial phase modulator 61 applies an optimal corrected spatial phase distribution $\phi_{mn}^{ref,opt}(t)$ to the reference signal, so that the spatial intensity distribution $I_{ij}^{ref}(t)$ of the reference signal is correlated with that of the backscattered object signal, thus optimizing the spatial distribution of the parameter of interest representing the heterodyne signal.

As in FIGS. 2A and 2B, the backscattered object signal has a speckle pattern, the speckle grains of which have a lateral dimension $d_{sp}$ of the order of $2 \times \lambda \times NO$ in the reception plane. Their size $d_{sp}$ can be greater than the size $d_{px}$ of the detection pixels, or they can be smaller or equal in size. Each detection pixel $P_{ij}$ is illuminated on a surface $S^{or}(t)$ by the backscattered object signal.

However, the reference signal no longer has an even spatial intensity distribution $I_{ij}^{ref}(t)$, as in FIGS. 2A and 2B, but has an uneven spatial intensity distribution resulting in the presence of bright zones surrounded by dark zones. This equivalent "speckle pattern" of the reference signal originates from the optimal corrected spatial phase distribution $\phi_{mn}^{ref,opt}(t)$ applied by the spatial phase modulator 61, which takes into account the spatial intensity distribution $I_{ij}^{or}(t)$ of the backscattered object signal. Thus, the bright zones of the reference signal have a geometrical distribution that is more or less similar to that of the speckle grains: their size $d_{zb}^{ref}$ is of the order of the size $d_{sp}$ of the speckle grains, and, on the other hand, they are at least partly superimposed on the speckle grains.

Furthermore, as previously mentioned, the surface $S_{ij}^{ref}(t)$ illuminated by the bright zones of the reference signal is reduced, which helps to increase the intensity $I_{ij}^{het}$ of the heterodyne signal (direct and alternating components), to improve the intensity $AC_{ij}^{het}(t)$ of the alternating component, and to improve the signal-to-noise ratio $SNR_{ij}^{het}(t)$. The performance capabilities of the imaging system 1 thus are improved.

FIG. 6A is a flow chart showing steps of a method for determining a distance map $D_{ij}(t_i)$ of the scene using an imaging system 1 according to one embodiment. Of course, the various steps are separated for the sake of clarity, but several of them are performed simultaneously or practically simultaneously.

The determination method in this case is performed based on direct optimization of the spatial intensity distribution $I_{ij}^{ref}(t_i)$ of the reference signal, on the basis of a transfer function H connecting the corrected spatial phase distribution $\phi_{mn}^{ref}$ applied to the reference signal to the spatial intensity distribution $I_{ij}^{ref}$ of the reference signal in the reception plane. Moreover, in the determination method of FIG. 6A, the parameter of interest is the intensity of the heterodyne signal, and the intention is to make the spatial intensity distribution $I_{ij}^{ref}(t_i)$ of the reference signal similar to the spatial intensity distribution $I_{ij}^{or}(t_i)$ of the backscattered object signal. This method is particularly suitable for the case where the size $d_{sp}$ of the speckle grains is greater than the size $d_{px}$ of the detection pixels.

During a preliminary step 090, a transfer function H is determined such that $I_{ij}^{ref} = H(\phi_{mn}^{ref})$. This step can be performed by digital simulation or by a parametric study, and takes into account optical elements of the optical transmission and imaging devices. The transfer function H is stored in a memory in the computation unit 62. Thus, knowledge of this transfer function H allows, on the basis of the corrected spatial phase distribution $\phi_{mn}^{ref}$ applied to the reference signal, the spatial intensity distribution $I_{ij}^{ref}$ thereof to be determined in the reception plane.

During step 100, the object signal $s^o(t)$ is projected so as to instantaneously, and preferably evenly, illuminate the scene.

The following steps are performed iteratively at an incremented determination instant $t_i$. At each determination instant $t_i$, the method determines a distance map $D_{ij}(t_i)$. Subsequently, the determination instant $t_i$ transitions to the next instant $t_{i+1}$. Each determination instant $t_i$ is associated with a phase of optimizing the spatial distribution of the parameter of interest, which is performed in two stages, denoted k=0 and k=1. Steps 110 to 113 relate to the first stage of the optimization phase (k=0), and steps 120 to 122 relate to the second stage (k=1).

During step 110, and simultaneously with step 100, the transmission of the reference signal $s^{ref}(t_{i,k=0})$ is suspended, for example, by means of a shutter. Furthermore, the intensity $I^{ref}(t_{i,k=0})$ of the transmitted reference signal is zero. Step 111 expresses the fact that the spatial phase modulator 61 remains inactive.

During a step 112, the matrix photodetector 50 receives and detects an incident optical signal, namely the backscattered object signal $s^{or}(t)$. Furthermore, the spatial intensity distribution $I_{ij}^{det}(t_{i,k=0})$ of the detected signal corresponds to the spatial intensity distribution $I_{ij}^{or}(t_{i,k=0})$ of the backscattered object signal, which therefore has a speckle pattern. This spatial intensity distribution $I_{ij}^{or}(t_{i,k=0})$ is transmitted to the computation unit 62 and stored in a memory.

During step 113, the computation unit 62 determines the optimal corrected spatial phase distribution $\phi_{mn}^{ref,opt}(t_i)$ to be applied to the reference signal so that its spatial intensity distribution $I_{ij}^{ref}(t_{i,k=1})$ is equal to the detected spatial intensity distribution $I_{ij}^{or}(t_{i,k=0})$. In other words, the following is computed: $\phi_{mn}^{ref,opt}(t_i)=H^{-1}(I_{ij}^{or}(t_{i,k=0}))$.

The second stage of the optimization phase (k=1) then begins. During step 120, the transmission of the reference signal $s^{ref}(t_{i,k=1})$ is authorized. It then propagates through the optical transmission device 30 and the phase correction device 60.

During step 121, the spatial phase modulator 61 applies the optimal corrected spatial phase distribution $\phi_{mn}^{ref,opt}(t_i)$ to the reference signal, so that the reference signal then has the optimal corrected spatial intensity distribution $I_{ij}^{ref,opt}(t_{i,k=1})$ in the reception plane. This is then substantially equal to the spatial intensity distribution $I_{ij}^{or}(t_{i,k=0})$ of the backscattered object signal (and therefore of the speckle pattern). The equality in this case basically relates to the geometrical distribution of the bright and dark zones, the total luminous flux (integrated over the entire surface of the matrix of detection pixels) of the reference signal may or may not be equal to that of the backscattered object signal.

During step 122, the matrix photodetector 50 receives and detects an incident optical signal, that is now the backscattered object signal and the reference signal, which form the heterodyne signal. Furthermore, the spatial intensity distribution $I_{ij}^{det}(t_{i,k=1})$ of the detected signal corresponds to the spatial intensity distribution $I_{ij}^{het}(t_{i,k=1})$ of the heterodyne signal. This depends on the spatial intensity distribution $I_{ij}^{or}(t_{i,k=1})$ of the backscattered object signal and of the spatial intensity distribution $I_{ij}^{ref,opt}(t_{i,k=1})$ of the reference signal.

Furthermore, the reference signal has a "speckle pattern" that is correlated with that of the backscattered object signal. The total luminous flux remains constant, but it is distributed in bright zones that are substantially superimposed on the speckle grains. The surfaces $S_{ij}^{ref,opt}(t_{i,k=1})$ illuminated by the bright zones of the reference signal are therefore reduced compared to an even illumination. Furthermore, this uneven illumination by the reference signal, and correlated with the speckle pattern of the backscattered object signal, improves both the intensity of the heterodyne signal (direct and alternating components), the intensity of the alternating component of the heterodyne signal (useful signal) alone, as well as its signal-to-noise ratio. The performance capabilities of the imaging system 1 are therefore improved. Of course, it is assumed that the matrix photodetector does not saturate when receiving incident optical signals.

During step 130, the imaging system 1 computes the beat frequency $f_b$ of the heterodyne signal at each detection pixel, and determines the distance map $D_{ij}(t_i)$ of the scene. Subsequently, the determination instant $t_i$ transitions to the next instant $t_{i+1}$. The determination method can then continue by repeating step 110, in particular when the scene is dynamic.

FIG. 6B is a flow chart showing steps of another method for determining a distance map $D_{ij}(t_i)$ of the scene using an imaging system 1 according to one embodiment. In this case again, the various steps are separated for the sake of clarity, but several of them are performed simultaneously or practically simultaneously.

The determination method in this case is performed on the basis of an iterative modification of the spatial intensity distribution $I_{ij}^{ref}(t_i)$ of the reference signal, thus optimizing the spatial distribution of the parameter of interest. This can be the intensity of the heterodyne signal (direct and alternating components), the intensity of the alternating component of the heterodyne signal alone, or even the signal-to-noise ratio. This method can be used in the case whereby the size $d_{sp}$ of the speckle grains is greater than the size $d_{px}$ of the detection pixels, as in the case whereby the size $d_{sp}$ is less than $d_{px}$.

During step 200, the object signal $s^o(t)$ is projected so as to simultaneously and preferably evenly illuminate the scene.

During step 210, at the same time as step 200, the reference signal $s^{ref}(t)$ is transmitted. It then propagates through the optical transmission device 30 and the phase correction device 60, towards the matrix photodetector 50 (passing through the optical imaging device 40).

The following steps 220 to 224 form part of the phase of optimizing the spatial distribution of the parameter of interest. They are performed iteratively, with an indicator that transitions from an initial value k=0 to a final value kf. This iterative optimization is performed for each determination instant $t_i$. When it is completed, the determination instant $t_i$ transitions to the next instant $t_{i+1}$.

During step 220, the spatial phase modulator 61 applies a corrected spatial phase distribution $\phi_{mn}^{ref}(t_{i,k})$ to the reference signal, so that this reference signal has the spatial intensity distribution $I_{ij}^{ref}(t_{i,k})$ in the reception plane. For the initial iteration k=0, the corrected spatial phase distribution $\phi_{mn}^{ref}(t_{i,k})$ can be even, or can comprise random phase variations, or even can be equal to the optimal spatial phase distribution $\phi_{mn}^{ref}(t_{i-1,kf})$ determined at the previous instant $t_{i-1}$.

During step 221, the matrix photodetector 50 receives and detects an incident optical signal, namely the backscattered object signal and the reference signal, which form the heterodyne signal, which then has the spatial intensity distribution $I_{ij}^{het}(t_{i,k})$. This depends on the spatial intensity distribution $I_{ij}^{or}(t_i)$ of the backscattered object signal and on the corrected spatial intensity distribution $I_{ij}^{ref}(t_{i,k})$ of the reference signal. It should be noted that the backscattered object signal can have an unchanged spatial intensity distribution $I_{ij}^{or}(t_i)$ during the various iterations of the optimization phase (when the scene is static) or can have small variations.

During step 222, the spatial distribution of the parameter of interest is determined. This can be the intensity of the heterodyne signal (direct and alternating components), the intensity of the alternating component of the heterodyne signal (useful signal) alone, or the signal-to-noise ratio. In this example, it is the signal-to-noise ratio $SNR_{ij}^{het}(t_{i,k})$.

During step 223, an optimization criterion $C(t_{i,k})$ is determined. It can involve the indicator k when the optimization is based on a predefined number of iterations: the value of the indicator is then compared to a predefined value kf (during step 224), and the optimization phase is repeated when this value is not reached. It can involve a local deviation between the spatial distribution $SNR_{ij}^{het}(t_{i,k})$ at iteration k and the spatial distribution $SNR_{ij}^{het}(t_{i,k})$ at the previous iteration k−1. This deviation can be the quadratic sum of the local deviations, the maximum of the local deviations (as shown in FIG. 6B), among others.

During step 224, the value of the optimization criterion $C(t_{i,k})$ is compared with a predefined value $C_{th}$. The optimization loop is repeated (k then changes to k+1), and steps 220 to 224 are performed again, until the optimization criterion reaches the predefined threshold value.

It should be noted that, during step 220, the spatial phase distribution $\phi_{mn}^{ref}(t_{i,k+1})$ at iteration k+1 is determined by the computation unit 62 on the basis of the optimization criterion determined at iteration k, and more specifically on the basis of the spatial distribution of the optimization criterion $C_{ij}(t_{i,k})$ (in this case on the basis of the difference $SNR_{ij}^{het}(t_{i,k})-SNR_{ij}^{het}(t_{i,k-1})$). The computation unit 62 thus can vary the local phase using an optimization algorithm (gradient descent, etc.) until the optimization criterion reaches the predefined threshold value.

Finally, during step 230, the imaging system 1 computes the beat frequency $f_b$ of the heterodyne signal at each detection pixel, and determines the distance map $D_{ij}(t_i)$ of the scene. Subsequently, the determination instant $t_i$ transitions to the next instant $t_{i+1}$. The determination method continues by repeating step 220.

It should be noted that these two examples of the determination method shown in FIGS. 6A and 6B are provided by way of an illustration. Other examples of the method can be implemented. Thus, it is possible to perform an iterative optimization similar to that shown in FIG. 6B within the scope of the method of FIG. 6A: thus, the spatial intensity distribution $I_{ij}^{ref}(t_{i,k})$ of the reference signal can tend towards the spatial intensity distribution $I_{ij}^{or}(t_{i,k})$ of the backscattered object signal via an iterative optimization.

FIGS. 7A to 7D show an advantageous configuration of the imaging system 1, in which an equivalent light source 36 of the reference signal is formed in an intermediate plane located at or near the aperture diaphragm. These figures show the reception plane of the matrix photodetector 50, the optical imaging device 40 (lenses 41, 43 and aperture diaphragm 42), and the equivalent light source 36 of the reference signal.

Furthermore, the optical transmission device 30, and if applicable the optical imaging device 40, produces the image of the spatial phase modulator 61 and/ or of the diffuser in the intermediate plane. The spatial phase modulator 61 and/ or the diffuser 32 are therefore located in a plane conjugated with the intermediate plane. This configuration is similar to that described in the French patent application FR 2000408 filed on 16 Jan. 2020. The longitudinal positioning of the equivalent light source 36 along the optical axis and its lateral dimension can be defined by optical shaping elements. The equivalent emission angle can be defined by the diffuser 32 of the optical transmission device 30 (FIG. 3A) or by the gratings matrix 61 (FIG. 3B).

The wavefront of the incident reference signal at each detection pixel is then brought closer to, or even identical to, that of the backscattered object signal, in terms of the shape and the main direction. This thus limits the generation of interference fringes between these two optical signals, with these interference fringes being likely to degrade the quality of the detected heterodyne signal.

The Field Of View (FOV) of the optical imaging device 40 is defined as being the angle at which the matrix photodetector 50 is sensitive to the backscattered object signal. In this case it is defined as being the angle, measured at the centre of the exit pupil, between two incident rays of the backscattered object signal passing through this same point O and arriving at two end pixels that are opposite each other with respect to the optical axis. An end pixel is a detection pixel located at the edge of the detection matrix. Furthermore, the exit pupil is the image of the aperture diaphragm via the lenses located downstream of said aperture diaphragm.

Figure 7A:
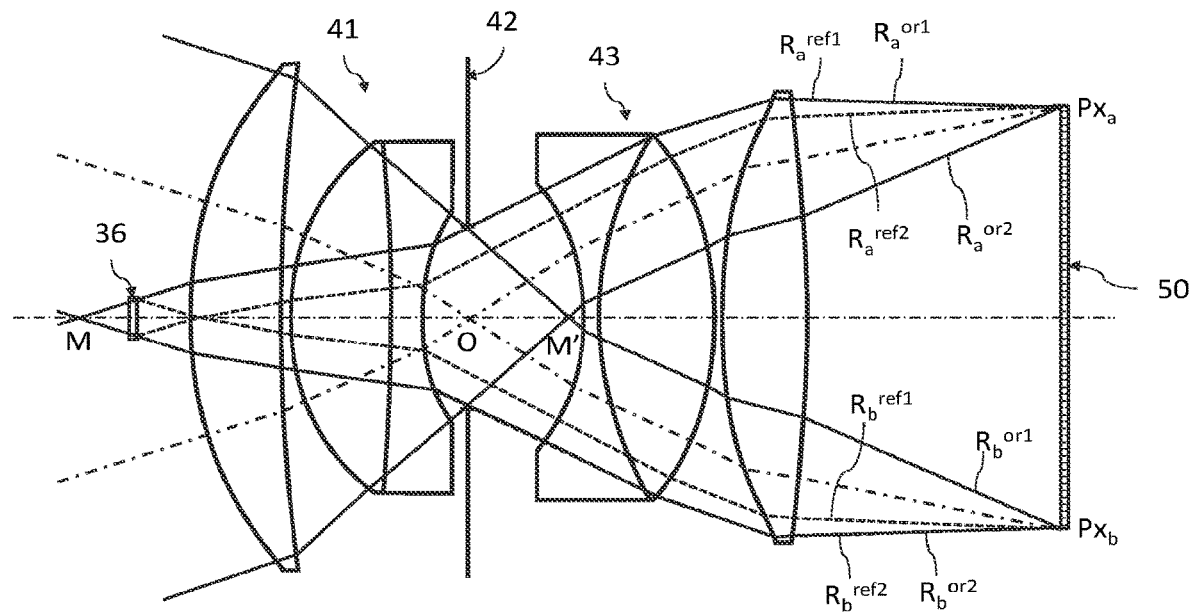
FIGS. 7A to 7D are schematic and partial views of the optical imaging device and of the matrix of detection pixels, showing.
Figure 7B:
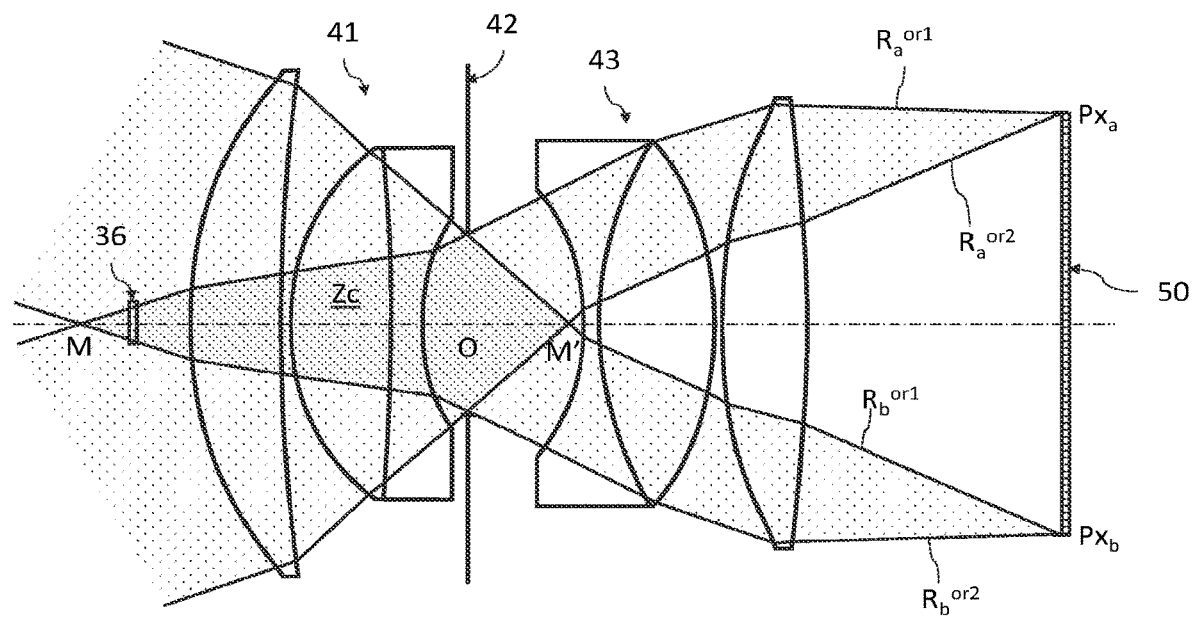

Next, as is more specifically shown in FIG. 7B, a central zone Zc of the rays at the edge of the unvignetted field is defined (unvignetted field is the term used in the publication by J. E. Greivenkamp entitled *Field Guide to Geometrical Optics*, SPIE Press, Bellingham, WA (2004)). It is defined herein as being the zone laterally demarcated by the edge rays of the full light field, i.e. by the rays of the backscattered object signal passing through the contour of the aperture diaphragm and arriving at end pixels of the matrix of detection pixels. These end pixels are those located at the edge of the matrix of detection pixels, i.e. the pixels furthest from the optical axis. This central zone assumes the form of two cones sharing the same base demarcated by the contour of the aperture diaphragm. The vertices of the cones are M and M', located on the optical axis, respectively upstream and downstream of the aperture diaphragm. They are the longitudinal end points of the central zone.

FIG. 7A shows, in a detailed and partial manner, as a longitudinal section view, the optical imaging device 40 and the reception plane of the imaging system 1 according to an alternative embodiment, in which the equivalent light source 36 of the reference signal, formed by the optical transmission device 30, is located in the central zone Zc, in this case upstream of the aperture diaphragm. The central zone Zc is more specifically shown in FIG. 7B.

For the two end pixels $Px_a$ and $Px_b$, the rays at the edge of the unvignetted field of the backscattered object signal are shown (solid lines), on the one hand, and the rays originating from two opposite ends of the equivalent light source 36 and received by each of the end pixels are shown (dashed lines), on the other hand.

Thus, with respect to the end pixel $Px_a$, in this case it receives the two rays $R_a^{or1}$, $R_a^{or2}$ of the backscattered object signal passing through the edge of the aperture diaphragm (in the longitudinal plane), as well as the two rays $R_a^{ref1}$, $R_a^{ref2}$ of the reference signal originating from the edge of the equivalent light source 36. The rays $R_a^{or1}$ and $R_a^{ref1}$ both pass through the same edge of the aperture diaphragm and are therefore superimposed. With respect to the rays received by the second end pixel $Px_b$, these are not detailed as the situation is similar.

The optical transmission device 30 is adapted so that the equivalent light source 36 has, at each of its points, a cone of divergence (or equivalent emission) that covers the entire matrix of detection pixels. Thus, each of the detection pixels effectively receives the reference signal in addition to the backscattered object signal. The heterodyne signal is thus properly formed at each detection pixel.

With the equivalent light source 36 being positioned between points M and M', and having a lateral dimension at least equal to that of the central zone, the reception cone of the reference signal is substantially identical to the reception cone of the backscattered object signal, at each detection pixel.

FIG. 7B is identical to FIG. 7A except that the rays of the reference signal $R_a^{ref}$, $R_b^{ref}$ originating from the equivalent light source 36 are not shown. The central zone Zc defined laterally and longitudinally by the rays at the edge of the unvignetted field $R_a^{or1}$, $R_a^{or2}$ and $R_b^{or1}$, $R_b^{or2}$ (in this case in a longitudinal plane) is highlighted in this case. The point M upstream of the aperture diaphragm is located on the optical axis and is at the intersection of the rays $R_a^{or1}$ and $R_b^{or2}$, whereas the point M' downstream of the aperture diaphragm is located on the optical axis and is at the intersection of the rays $R_a^{or2}$ and $R_b^{or1}$. The largest lateral dimension of the central zone Zc is located in the plane of the aperture diaphragm.

Figure 7C:
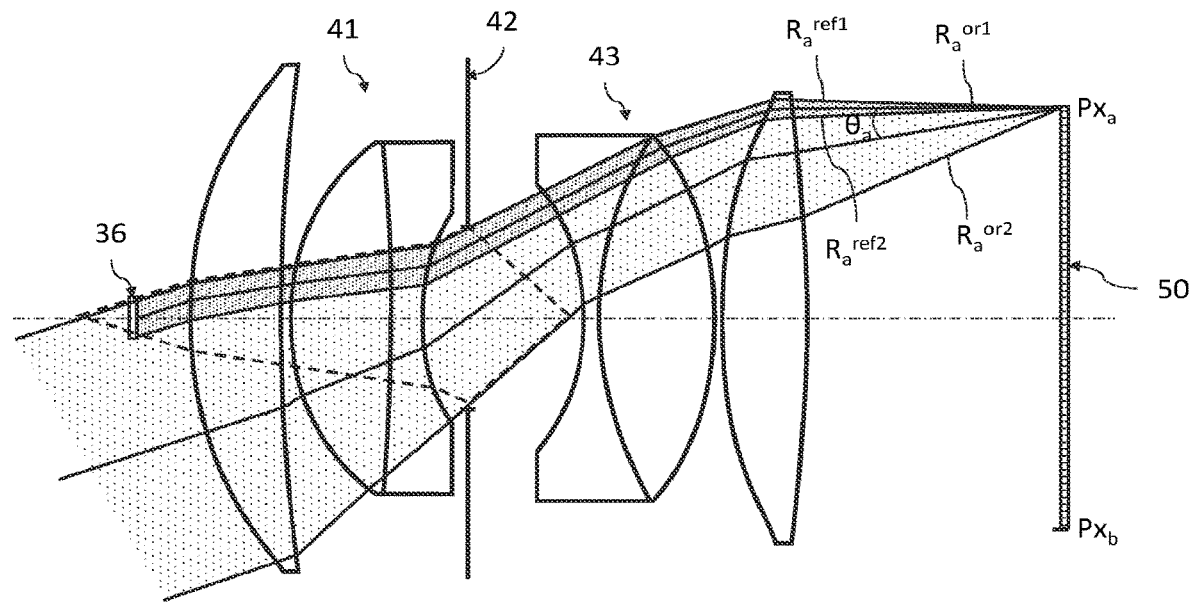

FIG. 7C is identical to FIG. 7A, except that only the rays received by the detection pixel $Px_a$ are considered, namely the rays $R_a^{or1}$ and $R_a^{or2}$ of the backscattered object signal and the rays $R_a^{ref1}$ and $R_a^{ref2}$ of the reference signal (the reference $R_a^{ref1}$ is not shown as this ray is coincident with the ray $R_a^{or1}$). Each point of this equivalent light source 36 illuminates at least the entire reception plane, and in this case only the reception plane. Thus, the same detection pixel receives, in addition to the backscattered object signal, the reference signal originating from all the points of the equivalent light source 36.

It should be noted here that the difference between the wavefronts of these optical signals has been reduced compared to the case whereby the equivalent source 36 would be located outside the central zone Zc: in particular, the value of the angle of deviation $\theta_a$ between the main directions of these wavefronts that are incident on the detection pixel $Px_a$ has been reduced. A main direction is defined as being the average direction of the angular cone of the incident beam (reference signal or backscattered object signal) at the considered detection pixel, in this case at the end pixel $Px_a$.

Thus, forming an equivalent light source 36 of the reference signal in the central zone Zc allows the angle of deviation θ at the considered detection pixel to be reduced. This thus increases the dimension of the inter-fringes that can form between the backscattered object signal and the reference signal. The dimension of the inter-fringes is, initially, of the order of $\lambda/2 \sin \theta$, where $\lambda$ is the wavelength of the incident optical signals. Having angular cones of the incident optical signals (reference signal and backscattered object signal) at each detection pixel that are very similar or even identical to each other also allows the dimension of the inter-fringe to be increased.

This thus improves the detected intensity of the heterodyne signal. Indeed, a significant angle of deviation θ between the main directions of the wavefronts and/ or a deviation between the angular cones of the incident optical signals leads to a reduction in the size of the inter-fringes, which then can be of the order of the size $d_{px}$ of the detection pixels, or even less. Furthermore, during the acquisition time of the photodiodes, the fact that several interference fringes (bright and dark zones) are present at the scale of each detection pixel can result in a degradation in the quality of the detection of the heterodyne signal.

It is particularly advantageous that the equivalent light source 36 is located as close as possible to the aperture diaphragm, and that its width is at least equal to, and preferably substantially equal to, that of the central zone, therefore, in this case, to that of the orifice of the aperture diaphragm.

Figure 7D:
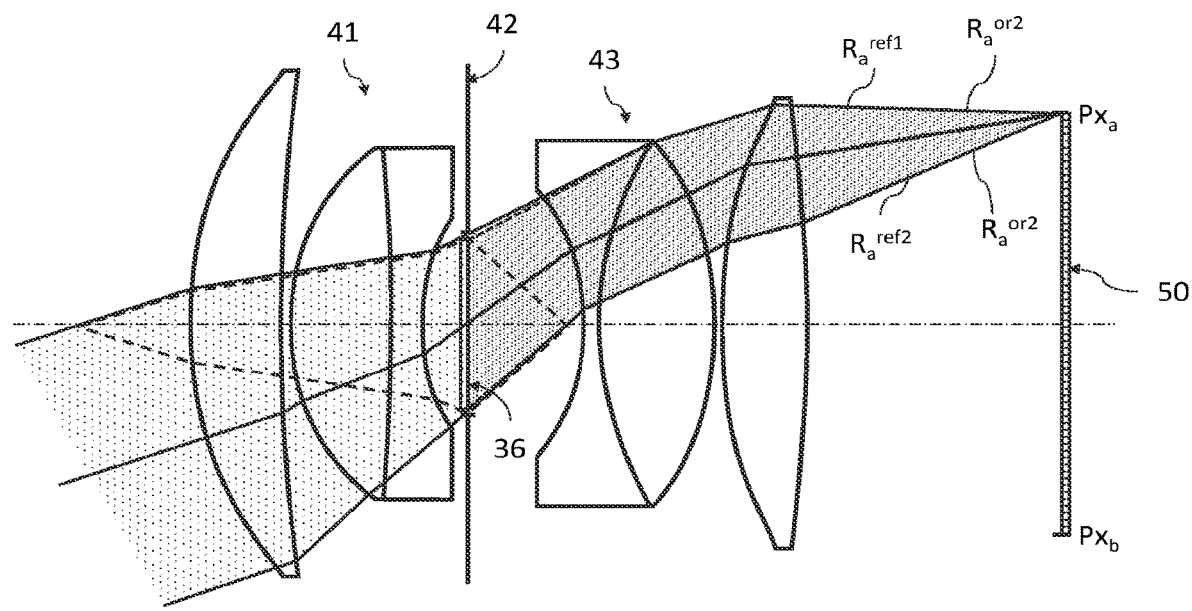

For this reason, FIG. 7D shows a variant of the configuration shown in FIG. 7C, in which the equivalent light source 36 in this case is located substantially in the plane of the aperture diaphragm 42. It can be seen that, at the detection pixel $Px_a$, the end rays $R_a^{or1}$ and $R_a^{ref1}$ are coincident, as are the rays $R_a^{or2}$ and $R_a^{ref2}$. The same is the case for the rays that define the main directions of these signals. The angle of deviation θ is then substantially zero. Furthermore, as the equivalent light source 36 covers substantially the entire surface of the aperture diaphragm 42, the angular cones of the two incident optical signals at each detection pixel are substantially equal. Furthermore, the wavefronts of the backscattered object signal and of the reference signal are substantially identical. The dimension of the inter-fringe can then exceed the dimensions of the detection matrix, so that it is possible to consider that there are no interference fringes between these signals that are likely to degrade the quality of the heterodyne signal detected by each detection pixel. Reference is then made to solid shade interference fringes. The performance capabilities of the imaging system 1 are then further improved.

Specific embodiments have been described above. Different variants and modifications will become apparent to a person skilled in the art.

The invention claimed is:

1. A LIDAR imaging system of the FMCW type, comprising:
   a coherent light source configured to emit a continuous frequency modulated primary signal;
   an optical device for projecting part of the primary signal, called object signal, onto a scene to be instantaneously illuminated;
   an optical device for transmitting part of the primary signal, called reference signal, to an optical imaging device;
   the optical imaging device configured to receive part of the object signal backscattered by the scene, called backscattered object signal, having a speckle pattern;
   a matrix photodetector comprising a matrix of detection pixels, each intended to receive, in a reception plane conjugated with the scene by the optical imaging system, the backscattered object signal and the reference signal that form a heterodyne signal having a frequency, called beat frequency, representing a distance between the matrix photodetector and the illuminated scene;
   a phase correction device, comprising:
      a spatial phase modulator, arranged on the path of the reference signal upstream of the optical imaging device, configured to apply a spatial phase distribution, called corrected spatial phase distribution, to the reference signal;
      a computation unit connected to the matrix photodetector and to the spatial phase modulator and configured to:
         determine an optimal corrected spatial phase distribution to be applied to the reference signal by the spatial phase modulator, as a function of a first spatial distribution representing a spatial intensity distribution of the backscattered object signal in the reception plane, detected by the matrix photodetector, so that the reference signal has a spatial intensity distribution, called corrected spatial intensity distribution, in the reception plane optimizing a spatial distribution of a parameter of interest representing the heterodyne signal, selected from among the intensity of the heterodyne signal, an intensity of an alternating component of the heterodyne signal, or a signal-to-noise ratio.

2. The imaging system according to claim 1, wherein the detection pixels have a lateral dimension that is less than $2\times\lambda\times NO$, where $\lambda$ is the wavelength of the backscattered object signal and where NO is a number of apertures of the optical imaging device.

3. The imaging system according to claim 1, wherein the optical projection and transmission devices comprise free space optical elements.

4. The imaging system according to claim 3, wherein the spatial phase modulator is a liquid crystal phase modulator.

5. The imaging system according to claim 1, wherein the optical projection device comprises guided optic optical elements produced in a functionalized substrate, including a diffraction gratings matrix configured to receive the primary signal via a waveguide and to project the object signal out of the functionalized substrate.

6. The imaging system according to claim 5, wherein the phase correction device comprises guided optic optical elements produced in said functionalized substrate, the spatial phase modulator comprising a diffraction gratings matrix configured to receive the reference signal via a waveguide and to project it out of the functionalized substrate after having applied the corrected spatial phase distribution thereto.

7. The imaging system according to claim 5, wherein the optical transmission device comprises free space optical elements configured to transmit the reference signal projected by the spatial phase modulator towards the optical imaging device.

8. The imaging system according to claim 5, wherein the matrix of detection pixels is produced in or on said functionalized substrate.

9. The imaging system according to claim 1, wherein the optical transmission and imaging devices are configured to transmit the reference signal and the backscattered object signal towards the matrix photodetector along the same optical axis.

10. The imaging system according to claim 1, wherein:
the optical imaging device comprises at least one free space optical element and an aperture diaphragm, thus defining, with respect to the matrix photodetector, a field of view, as well as a central zone laterally demarcated by rays at the edge of the unvignetted field backscattered object signal that propagate up to detection pixels, called end pixels, located at the edge of the detection matrix;
the optical transmission device and the optical imaging device are configured to form an image of the reference signal in an intermediate plane orthogonal to the optical axis of the optical imaging device (40), thus forming an equivalent light source of the reference signal;
the equivalent light source being contained in the central zone of the rays at the edge of the unvignetted field backscattered object signal;
the equivalent light source having, at each point, an emission angle for the reference signal that is at least equal to said field of view of the optical imaging device.

11. The imaging system according to claim 10, wherein the equivalent light source has a lateral dimension that is at least equal to that of the central zone of the rays at the edge of the unvignetted field backscattered object signal.

12. A method for determining a distance map of the scene using an imaging system according to claim 1, wherein the parameter of interest is the intensity of the heterodyne signal, the method comprising the following steps:
a/ projecting, by the optical projection device, the object signal towards the scene in order to instantaneously illuminate the scene;
b/ detecting, by the matrix photodetector, the first spatial intensity distribution of an incident optical signal representing the backscattered object signal;
c/ determining, by the computation unit, the corrected spatial phase distribution to be applied to the reference signal by the spatial phase modulator;
d/ applying, by the spatial phase modulator, the corrected spatial phase distribution to the reference signal;
e/ detecting, by the matrix photodetector, a spatial intensity distribution of the heterodyne signal;
f/ determining, by the computation unit, the spatial distribution of the parameter of interest, on the basis of the detected spatial intensity distribution of the heterodyne signal;
repeating, if applicable, steps c/ to f/ by modifying the corrected spatial phase distribution until a determination criterion that is a function of the spatial distribution of the parameter of interest reaches a predefined threshold value;
g/ determining the distance map when the determination criterion reaches the predefined threshold value.

13. The method according to claim 12, wherein:
during step b/, the transmission of the reference signal is suspended, so that the incident optical signal is the backscattered object signal;
during step c/, the corrected spatial phase distribution is determined, so that the spatial intensity distribution of the reference signal in the reception plane is substantially equal to the spatial intensity distribution of the detected backscattered object signal, on the basis of a predefined transfer function expressing the spatial intensity distribution of the reference signal in the reception plane as a function of a spatial phase distribution applied by the spatial phase modulator;
during step d/, the transmission of the reference signal is no longer suspended.

14. The method according to claim 12, wherein:
during step b/, the detected optical signal is the heterodyne signal;
steps c/ to f/ are repeated, with the spatial phase distribution being modified as a function of the optimization criterion in the previous iteration, as a function of a predefined optimization algorithm, until the optimization criterion reaches the predefined threshold value, thus optimizing the spatial distribution of the parameter of interest.

* * * * *